(12) United States Patent
Kubota et al.

(10) Patent No.: US 7,063,330 B2
(45) Date of Patent: Jun. 20, 2006

(54) SPHERICAL ANNULAR SEAL MEMBER AND METHOD OF MANUFACTURING THE SAME

(75) Inventors: Shuichi Kubota, Fujisawa (JP); Yoshikazu Sakairi, Fujisawa (JP); Toshihiko Shimura, Fujisawa (JP); Kouhei Kurose, Fujisawa (JP)

(73) Assignee: Oiles Corporation, Tokyo (JP)

( * ) Notice: Subject to any disclaimer, the term of this patent is extended or adjusted under 35 U.S.C. 154(b) by 62 days.

(21) Appl. No.: 10/680,343

(22) Filed: Oct. 8, 2003

(65) Prior Publication Data

US 2004/0066007 A1 Apr. 8, 2004

Related U.S. Application Data

(63) Continuation of application No. 09/831,727, filed as application No. PCT/JP00/05011 on Jul. 27, 2000, now abandoned.

(30) Foreign Application Priority Data

Sep. 28, 1999 (JP) .......................................... 11-275326

(51) Int. Cl.
*F16J 15/08* (2006.01)

(52) U.S. Cl. ...................... 277/627; 277/650; 277/651; 277/652

(58) Field of Classification Search .................. 277/627, 277/650, 651, 652, 626
See application file for complete search history.

(56) References Cited

U.S. PATENT DOCUMENTS

| | | | |
|---|---|---|---|
| 3,666,455 A | 5/1972 | Olstowski | |
| 4,146,401 A | 3/1979 | Yamada et al. | |
| 4,209,177 A | 6/1980 | Hall | |
| 4,244,934 A | 1/1981 | Kondo et al. | |
| 4,417,733 A | 11/1983 | Usher | |
| 4,462,603 A | 7/1984 | Usher et al. | |
| 4,516,782 A | 5/1985 | Usher | |

(Continued)

FOREIGN PATENT DOCUMENTS

| | | |
|---|---|---|
| EP | 0 857 863 A | 8/1998 |
| JP | 50-54621 | 5/1975 |
| JP | 54-76759 | 6/1979 |
| JP | 6-123362 | 5/1994 |
| JP | 09003256 | 1/1997 |
| JP | 10-9396 | 1/1998 |
| JP | 10-9397 | 1/1998 |

*Primary Examiner*—Enoch Peavey
(74) *Attorney, Agent, or Firm*—Nixon & Vanderhye

(57) ABSTRACT

A spherical annular seal member 55 has a cylindrical inner surface 52 defining a through hole 51 in a central portion thereof, an outer surface 53 formed in the shape of a partially convex spherical surface, and an annular end face 54 on a large-diameter side of the outer surface 53. In its inner portion extending from the cylindrical inner surface 52 to the outer surface 53 formed in the shape of the partially convex spherical surface, the spherical annular seal member 55 has a reinforcing member 6 made from a compressed metal wire net 5, as well as a heat-resistant material, which contains expanded graphite, phosphorus pentoxide, and a phosphate, fills meshes of the metal wire net 5 of the reinforcing member 6, and is compressed in such a manner as to be formed integrally with the reinforcing member 6 in mixed form. The outer surface 53 formed in the shape of the partially convex spherical surface is formed into a smooth surface where an outer surface layer of the heat-resistant material containing expanded graphite, phosphorus pentoxide, and the phosphate and the reinforcing member 6 made from the metal wire net 5 and formed integrally with the outer surface layer in mixed form are exposed.

36 Claims, 9 Drawing Sheets

U.S. PATENT DOCUMENTS

| | | |
|---|---|---|
| 4,547,434 A | 10/1985 | Sumiyoshi et al. |
| 4,551,393 A | 11/1985 | Sumiyoshi et al. |
| 4,559,248 A | 12/1985 | Sumiyoshi et al. |
| 4,559,249 A | 12/1985 | Arigaya et al. |
| 4,607,851 A | 8/1986 | Usher |
| 4,902,024 A | 2/1990 | Takenoshita |
| 5,040,805 A | 8/1991 | Ozora |
| 5,065,493 A | 11/1991 | Ozora |
| 5,382,387 A * | 1/1995 | von Bonin .................. 252/602 |
| 5,451,064 A | 9/1995 | Mercuri et al. |
| 5,499,825 A * | 3/1996 | Maeda et al. ................ 277/626 |
| 5,997,979 A | 12/1999 | Kashima |
| 6,228,914 B1 * | 5/2001 | Ford et al. .................. 524/124 |

* cited by examiner

F I G. 1
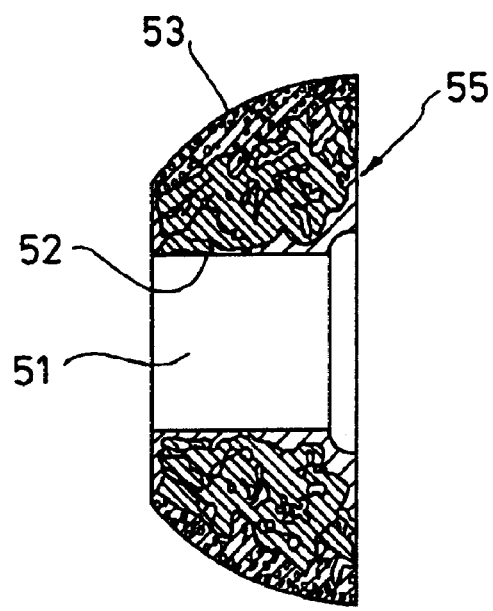
F I G. 2
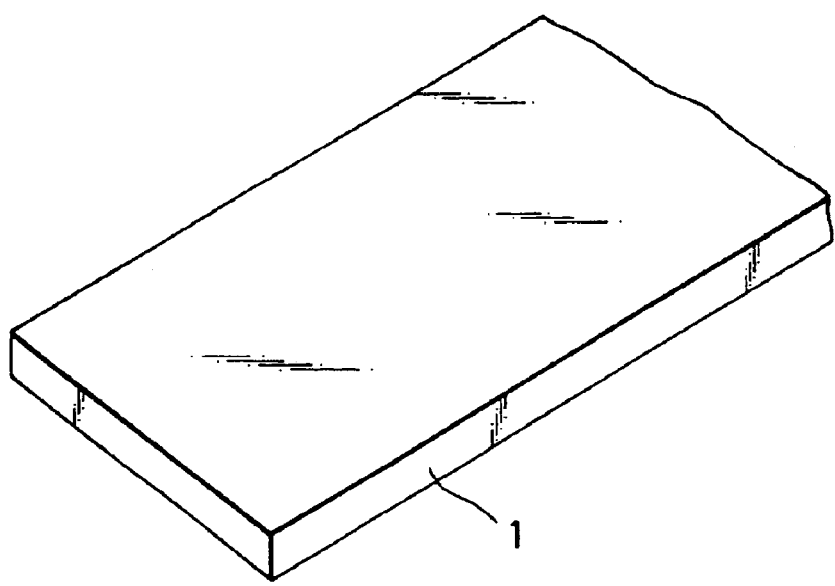

F I G. 9
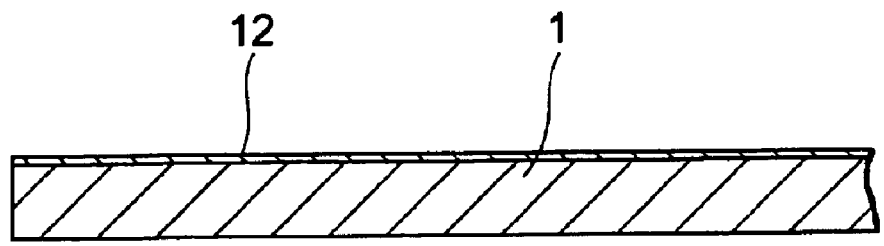
F I G. 10
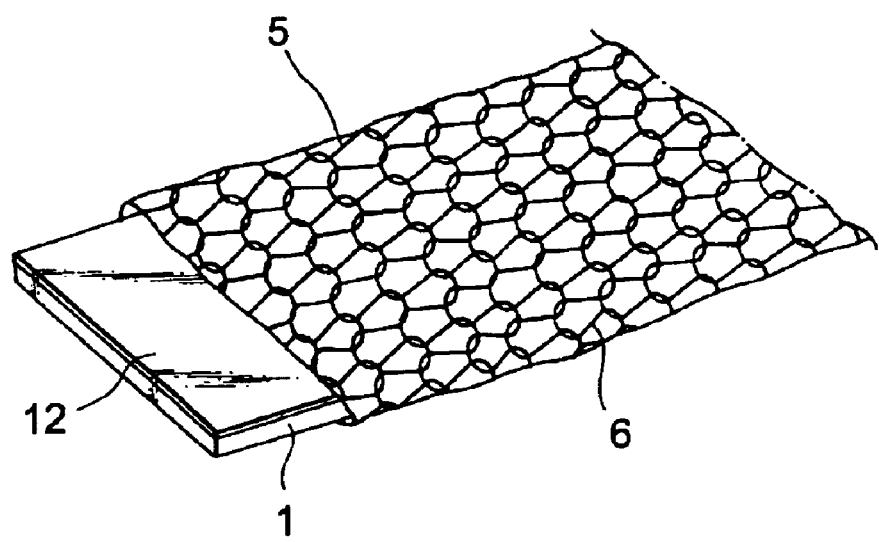

SPHERICAL ANNULAR SEAL MEMBER AND METHOD OF MANUFACTURING THE SAME

This application is a continuation of application Ser. No. 09/831,727, filed May 15, 2001 now abandoned, which is a 371 of PCT/JP00/05011, filed Jul. 27, 2000, the entire content of which is incorporated herein by reference.

TECHNICAL FIELD

The present invention relates to a spherical annular seal member used in a spherical pipe joint for an automobile exhaust pipe, as well as a method of manufacturing the same.

BACKGROUND ART

As a spherical annular seal member used in a spherical pipe joint for an automobile exhaust pipe, one disclosed in, for example, Japanese Patent Application Laid-Open No. 76759/1979 is known. The seal member disclosed in this publication is heat resistant, excels in affinity with a mating member, and has remarkably improved impact strength, but has a drawback in that the seal member often generates abnormal noise when it undergoes friction under dry frictional conditions. The drawback of this seal member is conceivably attributable to, among others, the fact that there is a large difference between the coefficient of static friction and the coefficient of dynamic friction of a heat-resistant material (such as expanded graphite) for forming the seal member, and to the fact that the seal member constituted by this heat-resistant material exhibits negative resistance with respect to the sliding velocity or speed.

Therefore, to overcome the above-described drawback, the present applicant proposed a seal member disclosed in Japanese Patent Application No. 300551/1992 (Japanese Patent Application Laid-Open No. 123362/1994). This seal member excels in the sealing characteristic without generating abnormal frictional noise in the sliding on a mating member, and satisfies the performance required of a seal member.

However, with respect to this proposed seal member as well, a new problem has been presented which is attributable to, among others, the improvement in recent years of the performance of automobile engines. That is, the conventional seal members are unable to satisfy the conditions of use in the light of heat resistance, owing to an increase in the exhaust-gas temperature due to the improved performance of the automobile engines, or owing to an increase in the exhaust-gas temperature attributable to the fact that the spherical pipe joint is located closer to the engine side in a case where the spherical pipe joint is disposed in the vicinity of an outlet (manifold) of the exhaust gases, for the purpose of improving the noise, vibration and harshness (NVH) characteristics of an automobile. Thus, there has been a compelling need for improvement of the heat resistance of the seal member itself.

With respect to the above-described newly presented problem, the present applicant proposed spherical annular seal members and methods of manufacturing the same in which heat resistance is improved through Japanese Patent Application No. 186783/1996 (Japanese Patent Application Laid-Open No. 9396/1998) and Japanese Patent Application No. 186784/1996 (Japanese Patent Application Laid-Open No. 9397/1998) (hereinafter, these applications for patent will be referred to as the prior art).

The spherical annular seal members in accordance with the above-described prior art are capable of suppressing oxidation and wear to low levels, do not generate abnormal frictional noise, excel in sealing characteristics, and are capable of satisfying their functions as seal members even under high temperatures of 600° C. to 700° C. However, in the case of these spherical annular seal members, since a heat-resistant sheet member, e.g., a heat-resistant sheet member having on the surfaces of an expanded graphite sheet a heat-resistant coating formed of heat-resistant materials, is used in the manufacturing methods, the flexibility inherent in the expanded graphite sheet is sacrificed. In consequence, there are possibilities that the cracking, breakage, and the like of the heat-resistant coating and, hence, the breakage and the like of the heat-resistant sheet member can often occur in the bending operation and the like involved in the manufacturing process. Thus, it was found that there is room for improvement in terms of the material yield, and that the elimination of the drawback of the material yield has the advantage of shortening the process of manufacturing the spherical annular seal member, leading to the reduction of the manufacturing cost.

The present invention has been devised in view of the above-described aspects, and its object is to provide a spherical annular seal member which exhibits performance equivalent to that of the spherical annular seal members of the above-described prior art in that the spherical annular seal member has heat resistance (resistance to oxidation and wear), does not generate abnormal frictional noise, and excels in the sealing characteristic even under high temperatures of 600° C. to 700° C., and which, in its manufacturing method, is capable of overcoming the drawback of the material yield of the heat-resistant sheet member and of lowering the manufacturing cost, as well as a method of manufacturing the same.

DISCLOSURE OF THE INVENTION

A spherical annular seal member in accordance with a first aspect of the present invention is a spherical annular seal member which has a cylindrical inner surface defining a through hole in a central portion thereof, an outer surface formed in the shape of a partially convex spherical surface, and an annular end face on a large-diameter side of the outer surface, and which is used particularly in an exhaust pipe spherical joint, comprising: a reinforcing member made from a compressed metal wire net and provided in an inner portion of the spherical annular seal member which extends from the cylindrical inner surface to the outer surface formed in the shape of the partially convex spherical surface; a heat-resistant material containing expanded graphite, phosphorus pentoxide, and a phosphate, and provided in the inner portion of the spherical annular seal member which extends from the cylindrical inner surface to the outer surface formed in the shape of the partially convex spherical surface, the heat-resistant material filling meshes of the metal wire net of the reinforcing member and compressed in such a manner as to be formed integrally with the reinforcing member in mixed form, the outer surface formed in the shape of the partially convex spherical surface being formed into a smooth surface where an outer surface layer of the heat-resistant material containing expanded graphite, phosphorus pentoxide, and the phosphate and the reinforcing member made from the metal wire net and formed integrally with the outer surface layer in mixed form are exposed.

In accordance with the spherical annular seal member according to the first aspect, in its inner portion extending from the cylindrical inner surface to the outer surface formed in the shape of the partially convex spherical surface, the spherical annular seal member has a reinforcing member made from a compressed metal wire net, as well as a heat-resistant material, which contains expanded graphite, phosphorus pentoxide, and a phosphate, fills meshes of the metal wire net of the reinforcing member, and is compressed in such a manner as to be formed integrally with the reinforcing member in mixed form. Therefore, the oxidation and wear of expanded graphite constituting a principal component of the heat-resistant material are reduced even under high temperatures of 600° C. to 700° C. by virtue of the oxidation suppressing action derived from phosphorus pentoxide and the phosphate. As a result, the heat resistance of the spherical annular seal member is improved.

In addition, since the outer surface formed in the shape of the partially convex spherical surface is formed into a smooth surface where the outer surface layer of the heat-resistant material and the reinforcing member made from the metal wire net and formed integrally with the outer surface layer in mixed form are exposed, the oxidation and wear of expanded graphite constituting the principal component of the heat-resistant material are reduced even under high temperatures of 600° C. to 700° C. by virtue of the oxidation suppressing action derived from phosphorus pentoxide and the phosphate. Hence, in the sliding contact with a mating member, the formation of an excess coating of the heat-resistant material which forms an outer surface layer on the surface of the mating member is suppressed, and smooth sliding contact with the surface of the mating member is effected.

As for the spherical annular seal member in accordance with a second aspect of the present invention, in the spherical annular seal member according to the first aspect, the cylindrical inner surface is formed of the heat-resistant material containing expanded graphite, phosphorus pentoxide, and the phosphate.

In accordance with the spherical annular seal member according to the second aspect, the oxidation and wear of expanded graphite constituting the principal component of the heat-resistant material at the cylindrical inner surface are reduced by virtue of the oxidation suppressing action derived from phosphorus pentoxide and the phosphate, with the result that the heat resistance of the cylindrical inner surface is improved.

As for the spherical annular seal member in accordance with a third aspect of the present invention, in the spherical annular seal member according to the first aspect, the cylindrical inner surface is formed of the reinforcing member made from the metal wire net.

In accordance with the spherical annular seal member according to the third aspect, since the cylindrical inner surface is formed into a surface where the reinforcing member made from the metal wire net is exposed, when the spherical annular seal member is fitted and fixed to the outer surface of the exhaust pipe, the friction between the cylindrical inner surface and the outer surface of the exhaust pipe is enhanced. Consequently, the spherical annular seal member is firmly fixed to the outer surface of the exhaust pipe.

As for the spherical annular seal member in accordance with a fourth aspect of the present invention, in the spherical annular seal member according to any one of the first to third aspects, the annular end face is formed of the heat-resistant material containing expanded graphite, phosphorus pentoxide, and the phosphate.

In accordance with the spherical annular seal member according to the fourth aspect, the oxidation and wear of expanded graphite constituting the principal component of the heat-resistant material at the annular end face are reduced by virtue of the oxidation suppressing action derived from phosphorus pentoxide and the phosphate, with the result that the heat resistance of the annular end face is improved.

As for the spherical annular seal member in accordance with a fifth aspect of the present invention, in the spherical annular seal member according to any one of the first to fourth aspects, the heat-resistant material is composed of 0.05 to 5.0 wt. % of phosphorus pentoxide, 1.0 to 16.0 wt. % of the phosphate, and 79.0 to 98.95 wt. % of expanded graphite.

In accordance with the spherical annular seal member according to the fifth aspect, since the heat-resistant material is composed of 0.05 to 5.0 wt. % of phosphorus pentoxide and 1.0 to 16.0 wt. % of the phosphate, which are necessary for allowing the oxidation suppressing action with respect to expanded graphite constituting the principal component to be demonstrated satisfactorily, the oxidation and wear of expanded graphite are reduced satisfactorily, so that the weight reduction of the spherical annular seal member due to the oxidation and wear of expanded graphite is reduced satisfactorily.

If the amount of phosphorus pentoxide is less than 0.05 wt. %, the effect of the oxidation suppressing action with respect to expanded graphite is not satisfactorily demonstrated, and if it is contained in excess of 5.0 wt. %, a further effect of the oxidation suppressing action is not satisfactorily demonstrated. Furthermore, if the amount of the phosphate is less than 1.0 wt. %, the effect of the oxidation suppressing action with respect to expanded graphite is not satisfactorily demonstrated in the same way as phosphorus pentoxide, and if it is contained in excess of 16.0 wt. %, a further effect of the oxidation suppressing action is not satisfactorily demonstrated.

As for the spherical annular seal member in accordance with a sixth aspect of the present invention, in the spherical annular seal member according to any one of the first to fifth aspects, the phosphate in the heat-resistant material is selected from lithium primary phosphate, lithium secondary phosphate, calcium primary phosphate, calcium secondary phosphate, aluminum primary phosphate, and aluminum secondary phosphate.

The spherical annular seal member in accordance with a seventh aspect of the present invention is a spherical annular seal member which has a cylindrical inner surface defining a through hole in a central portion thereof, an outer surface formed in the shape of a partially convex spherical surface, and an annular end face on a large-diameter side of the outer surface, and which is used particularly in an exhaust pipe spherical joint, comprising: a reinforcing member made from a compressed metal wire net and provided in an inner portion of the spherical annular seal member which extends from the cylindrical inner surface to the outer surface formed in the shape of the partially convex spherical surface; a heat-resistant material containing expanded graphite, phosphorus pentoxide, and a phosphate, and provided in the inner portion of the spherical annular seal member which extends from the cylindrical inner surface to the outer surface formed in the shape of the partially convex spherical surface, the heat-resistant material filling meshes of the metal wire net of the reinforcing member and compressed in such a manner as to be formed integrally with the reinforcing member in mixed form, the outer surface formed in the shape of the partially convex spherical surface being formed into a smooth surface where an outer surface layer of a lubricating composition containing at least boron nitride and at least one of alumina and silica and the reinforcing member made from the metal wire net and formed integrally with the outer surface layer in mixed form are exposed.

In accordance with the spherical annular seal member according to the seventh aspect, in its inner portion extending from the cylindrical inner surface to the outer surface formed in the shape of the partially convex spherical surface, a reinforcing member made from a compressed metal wire net, as well as a heat-resistant material, which contains expanded graphite, phosphorus pentoxide, and a phosphate, fills meshes of the metal wire net of the reinforcing member, and is compressed in such a manner as to be formed integrally with the reinforcing member in mixed form, are provided in such a manner as to be formed integrally in mixed form. Therefore, the oxidation and wear of expanded graphite constituting a principal component of the heat-resistant material are reduced even under high temperatures of 600° C. to 700° C. by virtue of the oxidation suppressing action derived from phosphorus pentoxide and the phosphate. As a result, the heat resistance of the spherical annular seal member is improved. In addition, smooth sliding is effected in the sliding contact with the mating member, since the outer surface formed in the shape of the partially convex spherical surface is formed into a smooth surface where the outer surface layer of the lubricating composition containing at least boron nitride and at least one of alumina and silica and the reinforcing member made from the metal wire net and formed integrally with the outer surface layer in mixed form are exposed.

As for the spherical annular seal member in accordance with an eighth aspect of the present invention, in the spherical annular seal member according to the seventh aspect, the cylindrical inner surface is formed of the heat-resistant material containing expanded graphite, phosphorus pentoxide, and the phosphate.

In accordance with the spherical annular seal member according to the eighth aspect, the oxidation and wear of expanded graphite constituting the principal component of the heat-resistant material at the cylindrical inner surface are reduced by virtue of the oxidation suppressing action derived from phosphorus pentoxide and the phosphate, with the result that the heat resistance of the cylindrical inner surface is improved.

As for the spherical annular seal member in accordance with a ninth aspect of the present invention, in the spherical annular seal member according to the seventh aspect, the cylindrical inner surface is formed of the reinforcing member made from the metal wire net.

In accordance with the spherical annular seal member according to the ninth aspect, since the cylindrical inner surface is formed into a surface where the reinforcing member made from the metal wire net is exposed, when the spherical annular seal member is fitted and fixed to the outer surface of the exhaust pipe, the friction between the cylindrical inner surface and the outer surface of the exhaust pipe is enhanced. Consequently, the spherical annular seal member is firmly fixed to the outer surface of the exhaust pipe.

As for the spherical annular seal member in accordance with a 10th aspect of the present invention, in the spherical annular seal member according to the seventh or eighth aspect, the annular end face is formed of the heat-resistant material containing expanded graphite, phosphorus pentoxide, and the phosphate.

In accordance with the spherical annular seal member according to the 10th aspect, the oxidation and wear of expanded graphite constituting the principal component of the heat-resistant material at the annular end face are reduced by virtue of the oxidation suppressing action derived from phosphorus pentoxide and the phosphate, with the result that the heat resistance of the annular end face is improved.

As for the spherical annular seal member in accordance with an 11th aspect of the present invention, in the spherical annular seal member according to any one of the seventh to 10th aspects, the heat-resistant material is composed of 0.05 to 5.0 wt. % of phosphorus pentoxide, 1.0 to 16.0 wt. % of the phosphate, and 79.0 to 98.95 wt. % of expanded graphite.

In accordance with the spherical annular seal member according to the 11th aspect, since the heat-resistant material is composed of 0.05 to 5.0 wt. % of phosphorus pentoxide and 1.0 to 16.0 wt. % of the phosphate, which are necessary for allowing the oxidation suppressing action with respect to expanded graphite constituting the principal component to be demonstrated satisfactorily, the oxidation and wear of expanded graphite are reduced satisfactorily, so that the weight reduction of the spherical annular seal member due to the oxidation and wear of expanded graphite is reduced satisfactorily.

If the amount of phosphorus pentoxide is less than 0.05 wt. %, the effect of the oxidation suppressing action with respect to expanded graphite is not satisfactorily demonstrated, and if it is contained in excess of 5.0 wt. %, a further effect of the oxidation suppressing action is not satisfactorily demonstrated. Furthermore, if the amount of the phosphate is less than 1.0 wt. %, the effect of the oxidation suppressing action with respect to expanded graphite is not satisfactorily demonstrated in the same way as phosphorus pentoxide, and if it is contained in excess of 16.0 wt. %, a further effect of the oxidation suppressing action is not satisfactorily demonstrated.

As for the spherical annular seal member in accordance with a 12th aspect of the present invention, in the spherical annular seal member according to any one of the seventh to 11th aspects, the phosphate is selected from lithium primary phosphate, lithium secondary phosphate, calcium primary phosphate, calcium secondary phosphate, aluminum primary phosphate, and aluminum secondary phosphate.

As for the spherical annular seal member in accordance with a 13th aspect of the present invention, in the spherical annular seal member according to any one of the seventh to 12th aspects, the lubricating composition contains 70–90 wt. % of boron nitride and 10–30 wt. % of at least one of alumina and silica.

In accordance with the spherical annular seal member according to the 13th aspect, since the outer surface formed in the shape of the partially convex spherical surface is formed on the smooth surface where the outer surface layer of the lubricating composition containing 70–90 wt. % of boron nitride and 10–30 wt. % of at least one of alumina and silica and the reinforcing member made from the metal wire net and formed integrally with the outer surface layer in mixed form are exposed, smooth sliding is effected particularly in the initial sliding on the mating member. Hence, it is possible to prevent the occurrence of abnormal noise of frictional sliding which often occurs in the initial period of sliding.

As for the spherical annular seal member in accordance with a 14th aspect of the present invention, in the spherical annular seal member according to any one of the seventh to 13th aspects, the lubricating composition further contains polytetrafluoroethylene resin.

As for the spherical annular seal member in accordance with a 15th aspect of the present invention, in the spherical annular seal member according to any one of the seventh to 12th aspects, the lubricating composition contains a mixture consisting of 70–90 wt. % of boron nitride and 10–30 wt. % of at least one of alumina and silica, and further contains not more than 200 parts by weight of polytetrafluoroethylene resin with respect to 100 parts by weight of the mixture.

As for the spherical annular seal member in accordance with a 16th aspect of the present invention, in the spherical annular seal member according to any one of the seventh to 12th aspects, the lubricating composition contains a mixture consisting of 70–90 wt. % of boron nitride and 10–30 wt. % of at least one of alumina and silica, and further contains 50 to 150 parts by weight of polytetrafluoroethylene resin with respect to 100 parts by weight of the mixture.

In accordance with the spherical annular seal member according to the 14th, 15th, and 16th aspects, since the outer surface formed in the shape of the partially convex spherical surface is formed on the smooth surface where the outer surface layer of the lubricating composition further containing polytetrafluoroethylene resin and the reinforcing member made from the metal wire net and formed integrally with the outer surface layer in mixed form are exposed, smoother sliding is effected particularly in the initial sliding on the mating member. Hence, it is possible to prevent the occurrence of abnormal noise of frictional sliding which often occurs in the initial period of sliding.

A method of manufacturing a spherical annular seal member in accordance with a first aspect of the present invention is a method of manufacturing a spherical annular seal member which has a cylindrical inner surface defining a through hole in a central portion thereof, an outer surface formed in the shape of a partially convex spherical surface, and an annular end face on a large-diameter side of the outer surface, and which is used particularly in an exhaust pipe spherical joint, comprising the steps of:

(a) preparing a heat-resistant sheet member containing expanded graphite, phosphorus pentoxide, and a phosphate;

(b) preparing a reinforcing member made from a metal wire net obtained by weaving or knitting fine metal wires, superposing the reinforcing member on the heat-resistant sheet member, and convoluting a superposed assembly of the reinforcing member and the heat-resistant sheet member into a cylindrical form, so as to form a tubular base member;

(c) preparing another heat-resistant sheet member containing expanded graphite, phosphorus pentoxide, and the phosphate and forming an outer-surface-layer forming member which includes the another heat-resistant sheet member and another reinforcing member made from a metal wire net disposed in such a manner as to cover the another heat-resistant sheet member;

(d) winding the outer-surface-layer forming member around an outer peripheral surface of the tubular base member so as to form a cylindrical preform; and (e) fitting the cylindrical preform over an outer peripheral surface of a core of a die, placing the core into the die, and compression-forming the cylindrical preform in the die in an axial direction of the core.

In accordance with the manufacturing method according to the first aspect, since the heat-resistant sheet member containing expanded graphite, phosphorus pentoxide, and the phosphate has flexibility equivalent to that of the ordinary expanded graphite sheet, defects such as cracking, breakage, and the like are not caused in the heat-resistant sheet member in the bending (convoluting) operation in the steps (b) and (d). Hence, no decline is caused in the yield of the sheet member. In addition, in the spherical annular seal member obtained in accordance with this manufacturing method, in its inner portion extending from the cylindrical inner surface to the outer surface formed in the shape of the partially convex spherical surface, the heat-resistant sheet member containing expanded graphite, phosphorus pentoxide, and the phosphate and the reinforcing member made from the metal wire net are compressed and intertwined with each other, and are thus arranged to be provided with structural integrity. The outer surface formed in the shape of the partially convex spherical surface is formed into a smooth surface where the heat-resistant material containing expanded graphite, phosphorus pentoxide, and the phosphate is filled in the meshes of another reinforcing member made from the metal wire net, and the two members are formed integrally in mixed form.

As for the manufacturing method in accordance with a second aspect of the present invention, in the manufacturing method according to the first aspect, the tubular base member is formed such that the heat-resistant sheet member is located on its inner surface.

In accordance with the manufacturing method according to the second aspect, in the manufactured spherical annular seal member, the oxidation and wear of expanded graphite constituting the principal component of the heat-resistant material at the cylindrical inner surface are reduced by virtue of the oxidation suppressing action derived from phosphorus pentoxide and the phosphate, with the result that the heat resistance of the cylindrical inner surface is improved.

As for the manufacturing method in accordance with a third aspect of the present invention, in the manufacturing method according to the first aspect, the tubular base member is formed such that the reinforcing member made from the metal wire net is located on its inner surface.

In accordance with the manufacturing method according to the third aspect, in the manufactured spherical annular seal member, since the cylindrical inner surface is formed into a surface where the reinforcing member made from the metal wire net is exposed, when the spherical annular seal member is fitted and fixed to the outer surface of the exhaust pipe, the friction between the cylindrical inner surface and the outer surface of the exhaust pipe is enhanced. Consequently, the spherical annular seal member is firmly fixed to the outer surface of the exhaust pipe.

As for the manufacturing method in accordance with a fourth aspect of the present invention, in the manufacturing method according to any one of the first to third aspects, the tubular base member is formed such that widthwise end portions of the heat-resistant sheet member respectively project from the reinforcing member in widthwise directions of the reinforcing member.

In accordance with the manufacturing method according to the fourth aspect, in the final step (e), as the heat-resistant sheet member projecting from the reinforcing member in widthwise directions of the reinforcing member is bent so as to form the annular end face on the large-diameter side of the outer surface formed in the shape of the partially convex spherical surface, and is spread, the annular end face on the large-diameter side of the outer surface formed in the shape of the partially convex spherical surface is formed of the composition of the heat-resistant sheet.

As for the manufacturing method in accordance with a fifth aspect of the present invention, in the manufacturing method according to any one of the first to fourth aspects, the heat-resistant sheet member is composed of 0.05 to 5.0 wt. % of phosphorus pentoxide, 1.0 to 16.0 wt. % of the phosphate, and 79.0 to 98.95 wt. % of expanded graphite. As for the method of manufacturing a spherical annular seal member in accordance with a sixth aspect of the present invention, in the method of manufacturing a spherical annular seal member according to any one of the first to fifth aspects, the another heat-resistant sheet member is composed of 0.05 to 5.0 wt. % of phosphorus pentoxide, 1.0 to 16.0 wt. % of the phosphate, and 79.0 to 98.95 wt. % of expanded graphite.

In accordance with the manufacturing method according to the fifth and sixth aspects, since each heat-resistant sheet member is composed of 0.05 to 5.0 wt. % of phosphorus pentoxide, 1.0 to 16.0 wt. % of the phosphate, and 79.0 to 98.95 wt. % of expanded graphite, and is flexible, no defects such as cracking, breakage, and the like occur in the heat-resistant sheet member in the respective steps of forming the tubular base member and the cylindrical preform.

As for the manufacturing method in accordance with a seventh aspect of the present invention, in the manufacturing method according to any one of the first to sixth aspects, the phosphate is selected from lithium primary phosphate, lithium secondary phosphate, calcium primary phosphate, calcium secondary phosphate, aluminum primary phosphate, and aluminum secondary phosphate.

The method of manufacturing a spherical annular seal member in accordance with an eighth aspect of the present invention is a method of manufacturing a spherical annular seal member which has a cylindrical inner surface defining a through hole in a central portion thereof, an outer surface formed in the shape of a partially convex spherical surface, and an annular end face on a large-diameter side of the outer surface, and which is used particularly in an exhaust pipe spherical joint, comprising the steps of:

(a) preparing a heat-resistant sheet member containing expanded graphite, phosphorus pentoxide, and a phosphate;

(b) preparing a reinforcing member made from a metal wire net obtained by weaving or knitting fine metal wires, superposing the reinforcing member on the heat-resistant sheet member, and convoluting a superposed assembly of the reinforcing member and the heat-resistant sheet member into a cylindrical form, so as to form a tubular base member;

(c) preparing another heat-resistant sheet member containing expanded graphite, phosphorus pentoxide, and the phosphate and forming an outer-surface-layer forming member which includes the another heat-resistant sheet member, a lubricating sliding layer of a lubricating composition containing at least boron nitride and at least one of alumina and silica and coated on one surface of the another heat-resistant sheet member, and another reinforcing member made from a metal wire net disposed in the lubricating sliding layer;

(d) winding the outer-surface-layer forming member around an outer peripheral surface of the tubular base member with a surface of the lubricating sliding layer placed on an outer side, so as to form a cylindrical preform; and (e) fitting the cylindrical preform over an outer peripheral surface of a core of a die, placing the core into the die, and compression-forming the cylindrical preform in the die in an axial direction of the core.

In accordance with the manufacturing method according to the eighth aspect, since the heat-resistant sheet member containing expanded graphite, phosphorus pentoxide, and the phosphate has flexibility equivalent to that of the ordinary expanded graphite sheet, defects such as cracking, breakage, and the like are not caused in the heat-resistant sheet member in the convoluting operation in the steps (b) and (d). Hence, no decline is caused in the yield of the sheet member. In addition, in the spherical annular seal member obtained in accordance with this manufacturing method, in its inner portion extending from the cylindrical inner surface to the outer surface formed in the shape of the partially convex spherical surface, the heat-resistant sheet member containing expanded graphite, phosphorus pentoxide, and the phosphate and the reinforcing member made from the metal wire net are compressed and intertwined with each other, and are thus arranged to be provided with structural integrality. The outer surface formed in the shape of the partially convex spherical surface is formed into a smooth surface where the outer surface layer of the lubricating composition and the reinforcing member made from the metal wire net formed integrally with that outer surface layer in mixed form are formed integrally in mixed form. Therefore, smooth sliding is effected particularly in the initial sliding on the mating member. Hence, it is possible to prevent the occurrence of abnormal noise of frictional sliding which often occurs in the initial period of sliding.

As for the manufacturing method in accordance with a ninth aspect of the present invention, in the manufacturing method according to the eighth aspect, the tubular base member is formed such that the heat-resistant sheet member is located on its inner surface.

In accordance with the manufacturing method according to the ninth aspect, in the manufactured spherical annular seal member, the oxidation and wear of expanded graphite constituting the principal component of the heat-resistant material at the cylindrical inner surface are reduced by virtue of the oxidation suppressing action derived from phosphorus pentoxide and the phosphate, with the result that the heat resistance of the cylindrical inner surface is improved.

As for the manufacturing method in accordance with a 10th aspect of the present invention, in the manufacturing method according to the eighth aspect, the tubular base member is formed such that the reinforcing member made from the metal wire net is located on its inner surface.

In accordance with the manufacturing method according to the 10th aspect, in the manufactured spherical annular seal member, since the cylindrical inner surface is formed into a surface where the reinforcing member made from the metal wire net is exposed, when the spherical annular seal member is fitted and fixed to the outer surface of the exhaust pipe, the friction between the cylindrical inner surface and the outer surface of the exhaust pipe is enhanced. Consequently, the spherical annular seal member is firmly fixed to the outer surface of the exhaust pipe.

As for the manufacturing method in accordance with an 11th aspect of the present invention, in the manufacturing method according to any one of the eighth to 10th aspects, the tubular base member is formed such that widthwise end portions of the heat-resistant sheet member respectively project from the reinforcing member in widthwise directions of the reinforcing member.

In accordance with the manufacturing method according to the 11th aspect, in the final step (e), as the heat-resistant sheet member projecting from the reinforcing member in widthwise directions of the reinforcing member is bent so as to form the annular end face on the large-diameter side of the outer surface formed in the shape of the partially convex spherical surface, and is spread, the annular end face on the large-diameter side of the outer surface formed in the shape of the partially convex spherical surface is formed of the composition of the heat-resistant sheet.

As for the manufacturing method in accordance with an 12th aspect of the present invention, in the manufacturing method according to any one of the eighth to 11th aspects, the heat-resistant sheet member is composed of 0.05 to 5.0 wt. % of phosphorus pentoxide, 1.0 to 16.0 wt. % of the phosphate, and 79.0 to 98.95 wt. % of expanded graphite. As for the manufacturing method in accordance with a 13th aspect of the present invention, in the manufacturing method according to any one of the eighth to 12th aspects, the another heat-resistant sheet member is composed of 0.05 to 5.0 wt. % of phosphorus pentoxide, 1.0 to 16.0 wt. % of the phosphate, and 79.0 to 98.95 wt. % of expanded graphite.

In accordance with the manufacturing method according to the 12th and 13th aspects, since the heat-resistant sheet member is composed of 0.05 to 5.0 wt. % of phosphorus pentoxide, 1.0 to 16.0 wt. % of the phosphate, and 79.0 to 98.95 wt. % of expanded graphite, and is flexible, no defects such as cracking, breakage, and the like occur in the heat-resistant sheet member in the respective steps of forming the tubular base member and the cylindrical preform.

As for the manufacturing method in accordance with a 14th aspect of the present invention, in the manufacturing method according to any one of the eighth to 13th aspects, the phosphate is selected from lithium primary phosphate, lithium secondary phosphate, calcium primary phosphate, calcium secondary phosphate, aluminum primary phosphate, and aluminum secondary phosphate.

As for the manufacturing method in accordance with a 15th aspect of the present invention, in the manufacturing method according to any one of the eighth to 14th aspects, the lubricating composition contains 70–90 wt. % of boron nitride and 10–30 wt. % of at least one of alumina and silica.

As for the manufacturing method in accordance with a 16th aspect of the present invention, in the manufacturing method according to any one of the eighth to 15th aspects, the lubricating composition further contains polytetrafluoroethylene resin.

As for the manufacturing method in accordance with a 17th aspect of the present invention, in the manufacturing method according to any one of the eighth to 14th aspects, the lubricating composition contains a mixture consisting of 70–90 wt. % of boron nitride and 10–30 wt. % of at least one of alumina and silica, and further contains not more than 200 parts by weight of polytetrafluoroethylene resin with respect to 100 parts by weight of the mixture.

As for the manufacturing method in accordance with an 18th aspect of the present invention, in the manufacturing method according to any one of the eighth to 14th aspects, the lubricating composition contains a mixture consisting of 70–90 wt. % of boron nitride and 10–30 wt. % of at least one of alumina and silica, and further contains 50 to 150 parts by weight of polytetrafluoroethylene resin with respect to 100 parts by weight of the mixture.

In accordance with the manufacturing method according to the 16th, 17th, and 18th aspects, since spreadability is imparted to the lubricating composition further containing polytetrafluoroethylene resin, in the final compression step, the outer surface formed in the shape of the partially convex spherical surface of the spherical annular seal member can be formed into a more uniform and smooth surface.

Hereafter, referring to the drawings, a detailed description will be given of the present invention on the basis of its embodiments. It should be noted that the present invention is not limited to these embodiments.

BRIEF DESCRIPTION OF THE DRAWINGS

FIG. 1 is a vertical cross sectional view illustrating a spherical annular seal member in accordance with the present invention;

FIG. 2 is a perspective view of a heat-resistant sheet member in a process of manufacturing the spherical annular seal member in accordance with the present invention;

FIG. 9 is a vertical cross-sectional view of a heat-resistant sheet member forming a lubricating sliding layer in the process of manufacturing the spherical annular seal member in accordance with the present invention;

FIG. 10 is a diagram explaining a method of forming the outer-surface-layer forming member in the process of manufacturing the spherical annular seal member in accordance with the present invention;

BEST MODE FOR CARRYING OUT THE INVENTION

Figure 3:
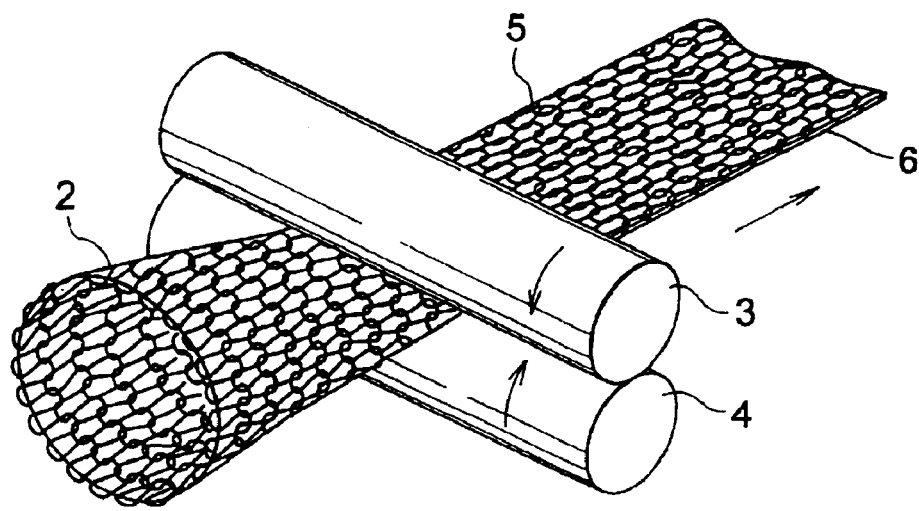
FIG. 3 is a diagram explaining a method of forming a reinforcing member constituted by a metal wire net in the process of manufacturing the spherical annular seal member in accordance with the present invention.

A description will be given of the constituent materials of a spherical annular seal member in accordance with the invention and a method of manufacturing the spherical annular seal member.

<Concerning Heat-Resistant Sheet Member>

While 300 parts by weight of concentrated sulfuric acid of a 98% concentration is being agitated, 5 parts by weight of a 60% aqueous solution of hydrogen peroxide is added to it as an oxidizing agent, and this solution is used as a reaction solution. This reaction solution is cooled and kept at a temperature of 10° C., 100 parts by weight of natural flake graphite powder having a particle size of 30 to 80 meshes is added to it, and reaction is allowed to take place for 30 minutes. After the reaction, acidized graphite is separated by suction filtration, and a cleaning operation is repeated twice in which the acidized graphite is agitated in 300 parts by weight of water for 10 minutes and is then subjected to suction filtration, thereby sufficiently removing the sulfuric acid content from the acidized graphite. Then, the acidized graphite with the sulfuric acid content sufficiently removed is dried for 3 hours in a drying furnace held at a temperature of 110° C., and this acidized graphite is used as an acidized graphite material.

While agitating 100 parts by weight of the acidized graphite material, a solution in which 0.082 to 10.4 parts by weight of aqueous orthophosphoric acid of an 84% concentration as a phosphoric acid and 2 to 40.5 parts by weight of aqueous aluminum primary phosphate of a 50% concentration as a phosphate are diluted with 10 parts by weight of methanol is compounded in the form of a spray with the acidized graphite material, and is agitated uniformly to obtain a wet mixture. This wet mixture is dried for 2 hours in the drying furnace held at a temperature of 120° C.

The dried mixture is subjected to expansion treatment for 5 seconds at a temperature of 1000° C. to generate cracked gases, and graphite layers are subjected to expansion by the gas pressure, thereby obtaining expanded graphite particles (expansion factor: 240-fold). In this expansion treatment process, orthophosphoric acid among the components undergoes dehydration reaction to generate phosphorus pentoxide, while aluminum primary phosphate practically does not change and is contained in coexistence with phosphorus pentoxide. An expanded graphite sheet with a thickness of 0.38 mm is fabricated by forming these expanded graphite particles into a roll by a double-roller apparatus having a nip of 0.35 mm, and this expanded graphite sheet is used as the heat-resistant sheet member.

The heat-resistant sheet member thus fabricated is composed of 0.05 to 5.0 wt. % of phosphorus pentoxide, 1.0 to 16.0 wt. % of phosphate, and 79.0 to 98.95 wt. % of expanded graphite, and is a flexible sheet member.

The phosphorus pentoxide and the phosphate (aluminum primary phosphate) in the heat-resistant sheet member exhibit the action of suppressing oxidation and wear of expanded graphite at high temperatures of 600° C. to 700° C. The content of phosphorus pentoxide is 0.05 to 5.0 wt. %, preferably 0.2 to 2.0 wt. %, while the content of phosphate is 1.0 to 16.0 wt. %, preferably 2.0 to 10.0 wt. %. The amount of the content of the phosphate, in particular, affects the flexibility of the heat-resistant sheet member, and if its content exceeds 16.0 wt. %, the heat-resistant sheet member shows the tendency of becoming hard and brittle. Therefore, the workability of the sheet member such as bending in the manufacturing method, which will be described later, is hampered.

<Concerning Reinforcing Member>

As a reinforcing member, a metal wire net is used which is formed by weaving or knitting one or more wire members including, as an iron-based wire, a stainless steel wire made of such as austenitic stainless steels SUS 304 and SUS 316, a ferritic stainless steel SUS 430, or an iron wire (JIS-G-3532) or a galvanized iron wire (JIS-G-3547), or, as a copper wire, a wire member made of a copper-nickel alloy (cupro-nickel), a copper-nickel-zinc alloy (nickel silver), brass, or beryllium copper. As the wire diameter of the fine metal wire forming the metal wire net, a fine metal wire having a diameter of 0.10 to 0.32 mm or thereabouts is used, and a metal wire net whose meshes are 3 to 6 mm or thereabouts is suitably used.

As the reinforcing member, in addition to the above-described metal wire net, it is also possible to use a so-called expanded metal in which a stainless steel sheet or a phosphor bronze sheet is slotted and the slots are expanded to form rows of regular meshes. The thickness of the stainless steel sheet or the phosphor bronze sheet is 0.3 to 0.5 mm or thereabouts, and an expanded metal whose meshes are 3 to 6 mm or thereabouts is suitably used.

<Concerning Lubricating Composition>

An aqueous dispersion containing as a solid content 20 to 50 wt. % of a lubricating composition consisting of 70 to 90 wt. % of boron nitride and 10 to 30 wt. % of at least one of alumina and silica is used. As an alternative lubricating composition, an aqueous dispersion is used which contains as a solid content 20 to 50 wt. % of a lubricating composition consisting of 70 to 90 wt. % of boron nitride and 10 to 30 wt. % of at least one of alumina and silica, as well as a lubricating composition which contains not more than 200 parts by weight, preferably 50 to 150 parts by weight, of polytetrafluoroethylene resin with respect to 100 parts by weight of the foregoing lubricating composition. The above-described aqueous dispersion of the lubricating composition is applied to the surface of the heat-resistant sheet member by means of brushing, roller coating, spraying, or the like in the manufacturing method which will be described later, and is used so as to form a lubricating sliding layer on the surface of the heat-resistant sheet by coating the surface of the heat-resistant sheet. In a final compression process, the lubricating sliding layer thus formed is spread into a uniform and very small thickness (10 to 300 µm) to form an outer surface layer on the outer surface formed in the shape of the partially convex spherical surface and its vicinities of the spherical annular seal member.

Boron nitride among the aforementioned lubricating compositions demonstrates excellent lubricity particularly at high temperatures. However, boron nitride as a single constituent is inferior in its adhesion onto the surface of the heat-resistant sheet member and, hence, in its adhesion onto the outer surface formed in the shape of the partially convex spherical surface of the spherical annular seal member in the final compression process. Consequently, boron nitride as a single constituent has a drawback in that it is easily exfoliated from these surfaces. However, by compounding at least one of alumina and silica with boron nitride at a fixed ratio, it is possible to avoid the aforementioned drawback of boron nitride, substantially improve its adhesion onto the surface of the expanded graphite sheet and, hence, onto the outer surface formed in the shape of the partially convex spherical surface of the spherical annular seal member in the final process, and enhance the retention of the lubricating sliding layer formed of the lubricating composition on the outer surface formed in the shape of the partially convex spherical surface of the spherical annular seal member. The proportion in which at least one of alumina and silica is compounded with respect to boron nitride is determined from the viewpoint of improving adhesion without impairing the lubricity of boron nitride, and a range of 10 to 30 wt. % is therefore preferable.

In the aforementioned lubricating composition which contains the lubricating composition consisting of 70 to 90 wt. % of boron nitride and 10 to 30 wt. % of at least one of alumina and silica, and further contains polytetrafluoroethylene resin at a fixed ratio with respect to 100 parts by weight of this lubricating composition, polytetrafluoroethylene resin itself has a low frictional property, and as it is compounded with the lubricating composition formed of boron nitride and at least one of alumina and silica, polytetrafluoroethylene resin exhibits the action of improving the low frictional property of the lubricating composition and the action of enhancing the ductility of the lubricating composition during compression forming.

The proportion in which polytetrafluoroethylene resin is compounded with respect to 100 parts by weight of the lubricating composition of 70 to 90 wt. % of boron nitride and 10 to 30 wt. % of at least one of alumina and silica is not more than 200 parts by weight, preferably in the range of 50 to 150 parts by weight. If the compounding proportion of polytetrafluoroethylene resin exceeds 200 parts by weight, the proportion of the resin in the lubricating composition becomes large, thereby resulting in a decline in the heat resistance of the lubricating composition. If the compounding proportion of polytetrafluoroethylene resin is in the range of 50 to 150 parts by weight, the low frictional property can be demonstrated most satisfactorily without impairing the heat resistance of the lubricating composition.

Boron nitride, at least one of alumina and silica for forming the aqueous dispersion as well as polytetrafluoroethylene resin which may be compounded therewith are preferably in the form of as fine powders as possible, and fine powders having average particle sizes of 10 μm or less are used.

Next, referring to the drawings, a description will be given of the method of manufacturing the spherical annular seal member composed of the above-described constituent materials.

<Manufacturing Method in Accordance with First Embodiment>

(First Process) As shown in FIG. 2, a heat-resistant sheet member 1 is prepared which is composed of 0.05 to 5.0 wt. % of phosphorus pentoxide, 1.0 to 16.0 wt. % of phosphate, and 79.0 to 98.95 wt. % of expanded graphite and cut to a predetermined width and length.

(Second Process) A metal wire net which is formed by weaving or knitting fine metal wires is prepared, and this metal wire net is used as a reinforcing member 6 by cutting it into a predetermined width and length (substantially identical to the width and length of the heat-resistant sheet member), or by a method in which, as shown in FIG. 3, after a cylindrical metal wire net 2 is formed by knitting fine metal wires, this cylindrical metal wire net 2 is passed between a pair of rollers 3 and 4 so as to fabricate a belt-shaped metal wire net 5, which is then cut.

Figure 4:
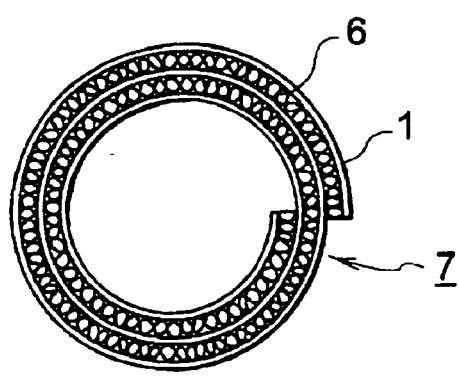
FIG. 4 is a plan view illustrating a tubular base member in the process of manufacturing the spherical annular seal member in accordance with the present invention.

(Third Process) The reinforcing member 6 formed by this belt-shaped metal wire net 5 and the aforementioned heat-resistant sheet member 1 are superposed one on top of the other, and this superposed assembly is convoluted with the heat-resistant sheet member 1 placed on the inner side such that heat-resistant sheet member 1 is convoluted with one more turn, thereby forming a tubular base member 7, as shown in FIG. 4.

Figure 5:
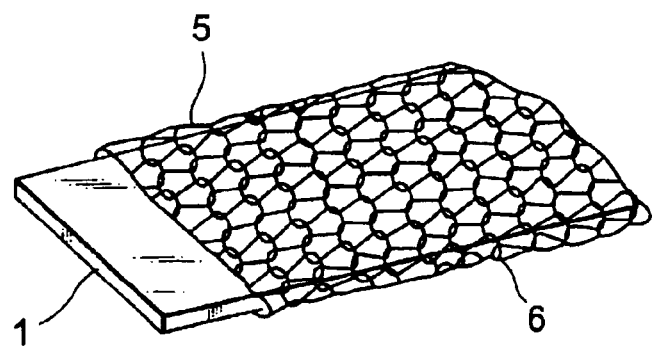
FIG. 5 is a diagram explaining a method of forming an outer-surface-layer forming member in the process of manufacturing the spherical annular seal member in accordance with the present invention.
Figure 6:
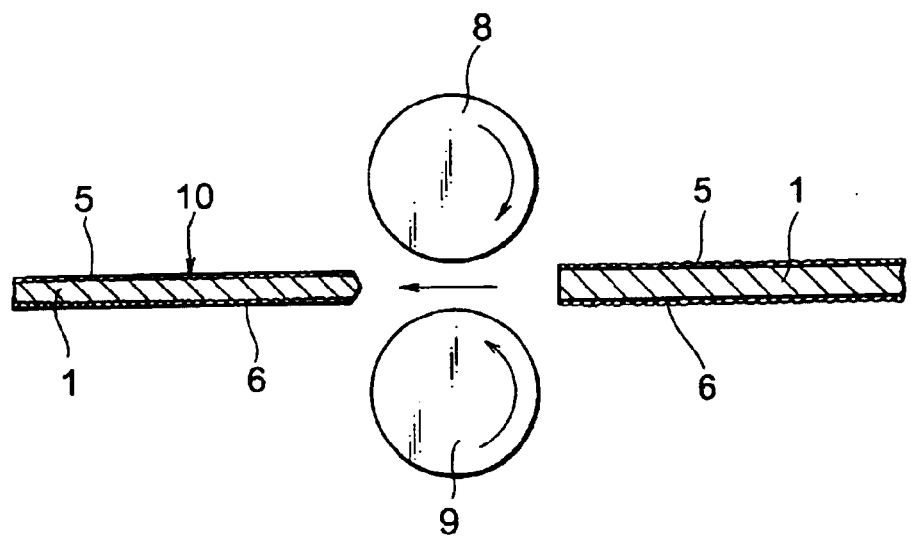
FIG. 6 is a diagram explaining a method of forming the outer-surface-layer forming member in the process of manufacturing the spherical annular seal member in accordance with the present invention.

(Fourth Process) Another heat-resistant sheet member 1 similar to the one described above is prepared separately. Meanwhile, as described earlier with reference to FIG. 3, after the fine metal wires are woven to form the cylindrical metal wire net 2, another reinforcing member 6 constituted by the belt-shaped metal wire net 5, which is fabricated by allowing the cylindrical metal wire net 2 to be passed between the pair of rollers 3 and 4, is prepared separately. Subsequently, as shown in FIG. 5, the heat-resistant sheet member 1 is inserted into the belt-shaped metal wire net 5, and, as shown in FIG. 6, an assembly thereof is passed between a pair of rollers 8 and 9 so as to be formed integrally, thereby preparing an outer-surface-layer forming member 10.

Figure 7:
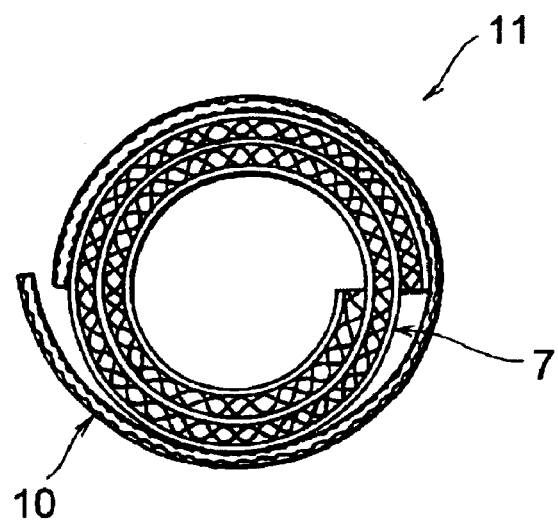
FIG. 7 is a plan view illustrating a cylindrical preform in the process of manufacturing the spherical annular seal member in accordance with the present invention.

(Fifth Process) The outer-surface-layer forming member 10 thus obtained is wound around an outer peripheral surface of the aforementioned tubular base member 7, thereby preparing a cylindrical preform 11, as shown in FIG. 7.

Figure 8:
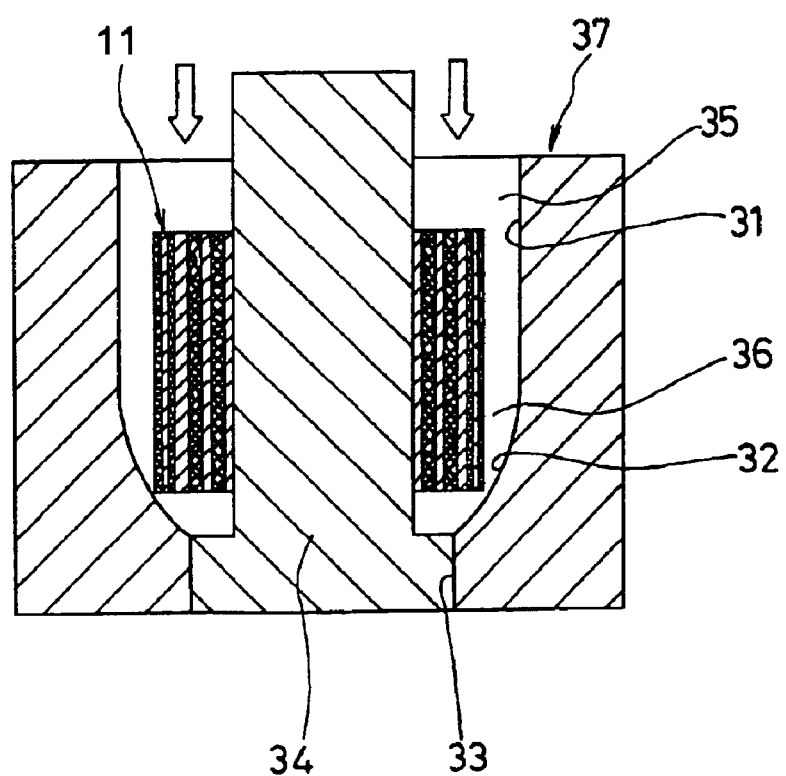
FIG. 8 is a vertical cross-sectional view illustrating a state in which the cylindrical preform is inserted in a die in the process of manufacturing the spherical annular seal member in accordance with the present invention.

(Sixth Process) As shown in FIG. 8, a die 37 is prepared which has a cylindrical inner wall surface 31, a partially concave spherical inner wall surface 32 continuing from the cylindrical inner wall surface 31, and a through hole 33 continuing from the partially concave spherical inner wall surface 32, and in which a hollow cylindrical portion 35 and a spherical annular hollow portion 36 continuing from the hollow cylindrical portion 35 are formed inside it as a stepped core 34 is inserted in the through hole 33. Then, the cylindrical preform 11 is fitted over the stepped core 34 of the die 37.

The cylindrical preform 11 located in the hollow portion of the die 37 is subjected to compression forming under a pressure of 1 to 3 tons/cm$^2$ in the direction of the core axis. Thus, a spherical annular seal member 55 having a cylindrical inner surface 52 defining a through hole 51 in its center and an outer surface 53 formed in the shape of a partially convex spherical surface is fabricated, as shown in FIG. 1. By means of this compression forming, in the inner portion of the spherical annular seal member 55 extending from the cylindrical inner surface 52 to the outer surface 53 formed in the shape of the partially convex spherical surface, the heat-resistant sheet member 1 and the reinforcing member 6, which is constituted by the metal wire net 5, are compressed and intertwined with each other, and are thus arranged to be provided with structural integrality. The outer surface 53 is formed into a smooth surface where the outer surface layer constituted by the heat-resistant sheet member 1 and the reinforcing member 6 constituted by the metal wire net 5 integrated with this outer surface layer in mixed form are exposed. The cylindrical inner surface 52 defining the through hole 51 is formed such that a heat-resistant material constituted of expanded graphite, phosphorus pentoxide, and phosphate is exposed.

In the spherical annular seal member 55 fabricated by the above-described method and shown in FIG. 1, the heat-resistant sheet member 1 is intertwined and formed integrally with the reinforcing member 6 constituted by the metal wire net 5 which forms an internal structure, while the outer surface 53 formed in the shape of the partially convex spherical surface is formed into a smooth surface in which the outer surface layer of the heat-resistant material formed by the outer-surface-layer forming member 10 and constituted of expanded graphite, phosphorus pentoxide, and phosphate, as well as the reinforcing member 6 constituted by the metal wire net 5, are integrated in mixed form.

<Manufacturing Method in Accordance with Second Embodiment>

The first to third processes are identical to those of the above-described first to third processes.

(Fourth Process) A heat-resistant sheet member 1 similar to the one described above is prepared separately. Subsequently, an aqueous dispersion containing as a solid content 20 to 50 wt. % of a lubricating composition constituted of 70 to 90 wt. % of boron nitride and 10 to 30 wt. % of at least one of alumina and silica, or an aqueous dispersion which contains as a solid content 20 to 50 wt. % of a lubricating composition consisting of 70 to 90 wt. % of boron nitride and 10 to 30 wt. % of at least one of alumina and silica, as well as a lubricating composition which contains not more than 200 parts by weight, preferably 50 to 150 parts by weight, of polytetrafluoroethylene resin with respect to 100 parts by weight of the foregoing lubricating composition, is coated on one surface of the heat-resistant sheet member 1 by means of brushing, roller coating, spraying, or the like. This coating is then dried to form a lubricating sliding layer 12 which is formed of the lubricating composition, as shown in FIG. 9.

Figure 11:
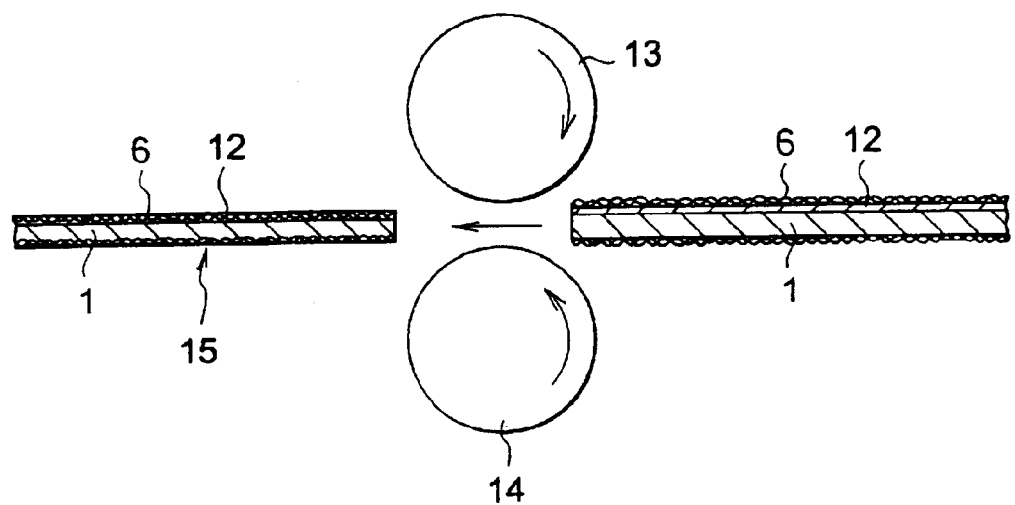
FIG. 11 is a diagram explaining a method of forming the outer-surface-layer forming member in the process of manufacturing the spherical annular seal member in accordance with the present invention.

The reinforcing member 6 constituted by the belt-shaped metal wire net 5, which has been described in the above-described third process, is prepared separately. Subsequently, as shown in FIG. 10, the heat-resistant sheet member 1 having the lubricating sliding layer 12 is inserted into the belt-shaped metal wire net 5, and, as shown in FIG. 11, an assembly thereof is passed between a pair of rollers 13 and 14 so as to be formed integrally, thereby preparing an outer-surface-layer forming member 15.

Figure 12:
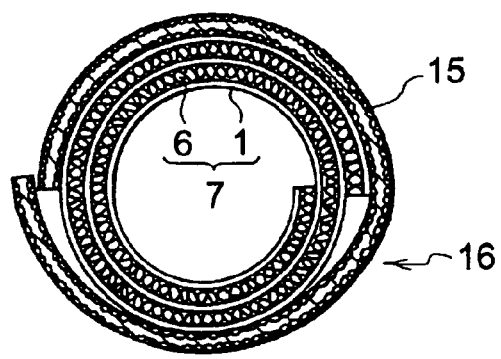
FIG. 12 is a plan view illustrating a cylindrical preform in the process of manufacturing the spherical annular seal member in accordance with the present invention.
Figure 13:
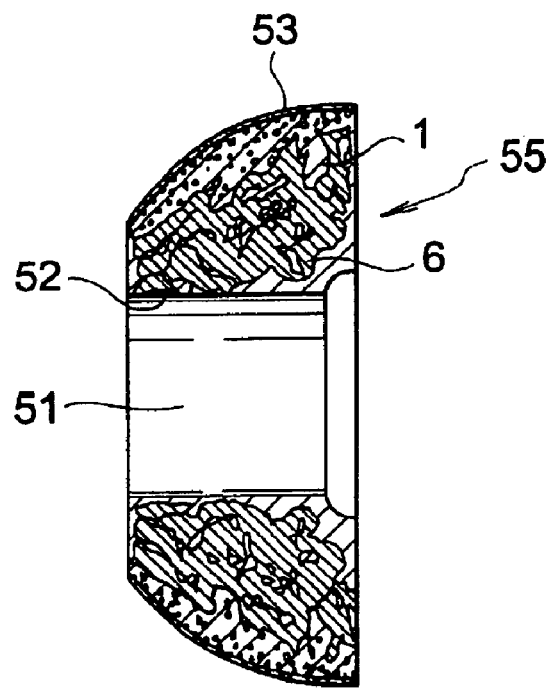
FIG. 13 is a vertical cross-sectional view illustrating another embodiment of the spherical annular seal member in accordance with the present invention.
Figure 14:
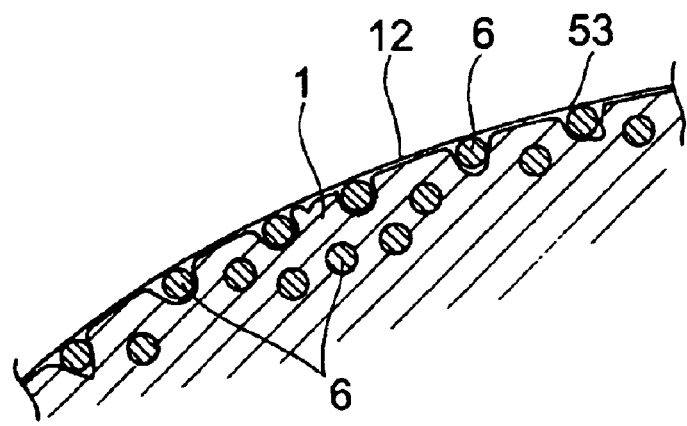
FIG. 14 is a partially enlarged cross-sectional view illustrating the outer surface, formed in the shape of the partially convex spherical surface, of the spherical annular seal member shown in FIG. 13.

(Fifth Process) The outer-surface-layer forming member 15 thus obtained is wound around the outer peripheral surface of the aforementioned tubular base member 7 with the lubricating sliding layer 12 placed on the outer side, thereby preparing a cylindrical preform 16, as shown in FIG. 12. This cylindrical preform 16 is subjected to compression forming in a method similar to that of the above-described sixth process. Thus, the spherical annular seal member 55 having the cylindrical inner surface 52 defining the through hole 51 in its center and the outer surface 53 formed in the shape of the partially convex spherical surface is fabricated, as shown in FIGS. 13 and 14. By means of this compression forming, in the inner portion of the spherical annular seal member 55 extending from the cylindrical inner surface 52 to the outer surface 53 formed in the shape of the partially convex spherical surface, the heat-resistant sheet member 1 and the reinforcing member 6, which is constituted by the metal wire net 5, are compressed and intertwined with each other, and are thus arranged to be provided with structural integrality. The outer surface 53 formed in the shape of the partially convex spherical surface is constituted by the exposed surface of the lubricating sliding layer 12 of the lubricating composition, and the reinforcing member 6 constituted by the metal wire net 5, which is formed integrally with the sliding layer 12, is disposed in the sliding layer 12. The outer surface 53 formed in the shape of the partially convex spherical surface, where the sliding layer 12 and the reinforcing member 6 constituted by the metal wire net 5 formed integrally with the sliding layer 12 in mixed form are exposed, is formed into a smooth surface, while the cylindrical inner surface 52 defining the through hole 51 is formed such that the heat-resistant material constituted of expanded graphite, phosphorus pentoxide, and phosphate is exposed.

In the spherical annular seal member 55 fabricated by the above-described method and shown in FIGS. 13 and 14, the heat-resistant sheet member 1 is intertwined and formed integrally with the reinforcing member 6 constituted by the metal wire net 5 which forms an internal structure, while the outer surface 53 formed in the shape of the partially convex spherical surface is formed into a smooth surface in which the exposed surface of the outer surface layer constituted of the lubricating composition formed by the outer-surface-layer forming member 10, as well as the reinforcing member 6 constituted by the metal wire net 5, are integrated in mixed form.

<Manufacturing Method in Accordance with Third and Fourth Embodiments>

(First Process) The first process is identical to that of the above-described manufacturing method in accordance with the first or second embodiment.

(Second Process) A metal wire net which is formed by weaving or knitting fine metal wires is prepared, and this metal wire net is used as the reinforcing member 6 by cutting it into a predetermined width larger than the width of the heat-resistant sheet member and a length substantially identical to the length of the heat-resistant sheet member, or by a method in which after the cylindrical metal wire net 2 is formed by knitting fine metal wires, this cylindrical metal wire net 2 is passed between the pair of rollers 3 and 4 so as to fabricate the belt-shaped metal wire net 5 having a width larger than that of the heat-resistant sheet member, and this belt-shaped metal wire net 5 is then cut.

Figure 15:
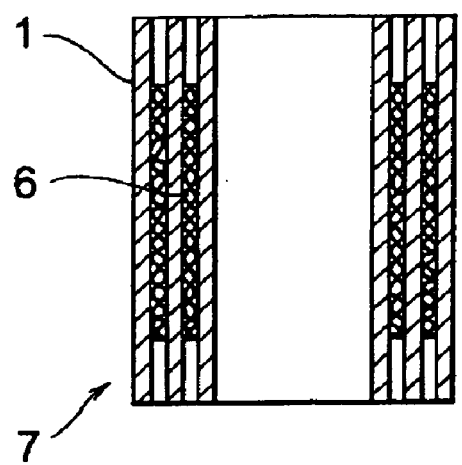
FIG. 15 is a vertical cross-sectional view illustrating the tubular base member in the process of manufacturing the spherical annular seal member in accordance with the other embodiment of the present invention.

(Third Process) The reinforcing member 6 formed by this belt-shaped metal wire net 5 and the aforementioned heat-resistant sheet member 1 are superposed one on top of the other, and this superposed assembly is convoluted with the heat-resistant sheet member 1 placed on the inner side such that heat-resistant sheet member 1 is convoluted with one more turn, thereby forming the tubular base member 7. In this tubular base member 7, the widthwise end portions of the heat-resistant sheet member 1 respectively project in the widthwise directions of the reinforcing member 6, as shown in FIG. 15.

The fourth to sixth processes are identical to those of the above-described manufacturing method in accordance with the first or second embodiment.

In the sixth process, the heat-resistant sheet member 1 projecting in the widthwise direction of the reinforcing member 6 is bent into an annular end face 54 on the large-diameter side of the outer surface 53 formed in the shape of the partially convex spherical shape, and is spread. Consequently, the annular end face 54 on the large-diameter side of the outer surface 53 formed in the shape of the partially convex spherical shape of the spherical annular seal member 55 is covered with the heat-resistant material composed of 0.05 to 5.0 wt. % of phosphorus pentoxide, 1.0 to 16.0 wt. % of phosphate, and 79.0 to 98.95 wt. % of expanded graphite.

Figure 16:
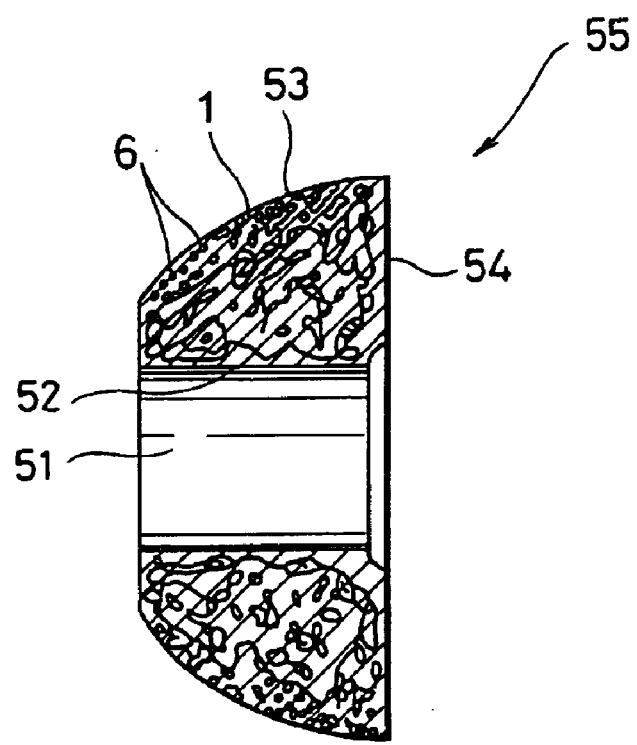
FIG. 16 is a vertical cross-sectional view illustrating still another embodiment of the spherical annular seal member in accordance with the present invention.

According to the above-described manufacturing method, as for the spherical annular seal member 55 in accordance with the third embodiment, as shown in FIG. 16, in its inner portion extending from the cylindrical inner surface 52 to the outer surface 53 formed in the shape of the partially convex spherical surface, the heat-resistant sheet member 1 and the reinforcing member 6, which is constituted by the metal wire net 5, are compressed and intertwined with each other, and are thus arranged to be provided with structural integrality. The outer surface 53 formed in the shape of the partially convex spherical surface is formed into a smooth surface where the outer surface layer constituted by the heat-resistant sheet member 1 and the reinforcing member 6 constituted by the metal wire net 5 integrated with this outer surface layer in mixed form are exposed. The cylindrical inner surface 52 defining the through hole 51 and the annular end face 54 on the large-diameter side of the outer surface 53 formed in the shape of the partially convex spherical shape are formed such that the heat-resistant material constituted of expanded graphite, phosphorus pentoxide, and phosphate is exposed.

Figure 17:
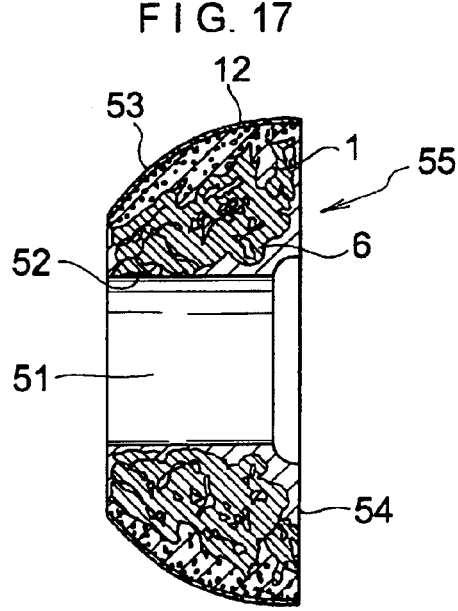
FIG. 17 is a vertical cross-sectional view illustrating a further embodiment of the spherical annular seal member in accordance with the present invention.

Meanwhile, as for the spherical annular seal member 55 in accordance with the fourth embodiment, as shown in FIG. 17, in its inner portion extending from the cylindrical inner surface 52 to the outer surface 53 formed in the shape of the partially convex spherical surface, the heat-resistant sheet member 1 and the reinforcing member 6, which is constituted by the metal wire net 5, are compressed and intertwined with each other, and are thus arranged to be provided with structural integrity. The outer surface 53 formed in the shape of the partially convex spherical surface is constituted by the exposed surface of the lubricating sliding layer 12 of the lubricating composition, and the reinforcing member 6 constituted by the metal wire net 5, which is formed integrally with the sliding layer 12, is disposed in the sliding layer 12. The outer surface 53 formed in the shape of the partially convex spherical surface, where the sliding layer 12 and the reinforcing member 6 constituted by the metal wire net 5 formed integrally with the sliding layer 12 in mixed form are exposed, is formed into a smooth surface, while the cylindrical inner surface 52 defining the through hole 51 and the annular end face 54 on the large-diameter side of the outer surface 53 formed in the shape of the partially convex spherical surface are formed such that the heat-resistant material constituted of expanded graphite, phosphorus pentoxide, and phosphate is exposed.

Figure 18:
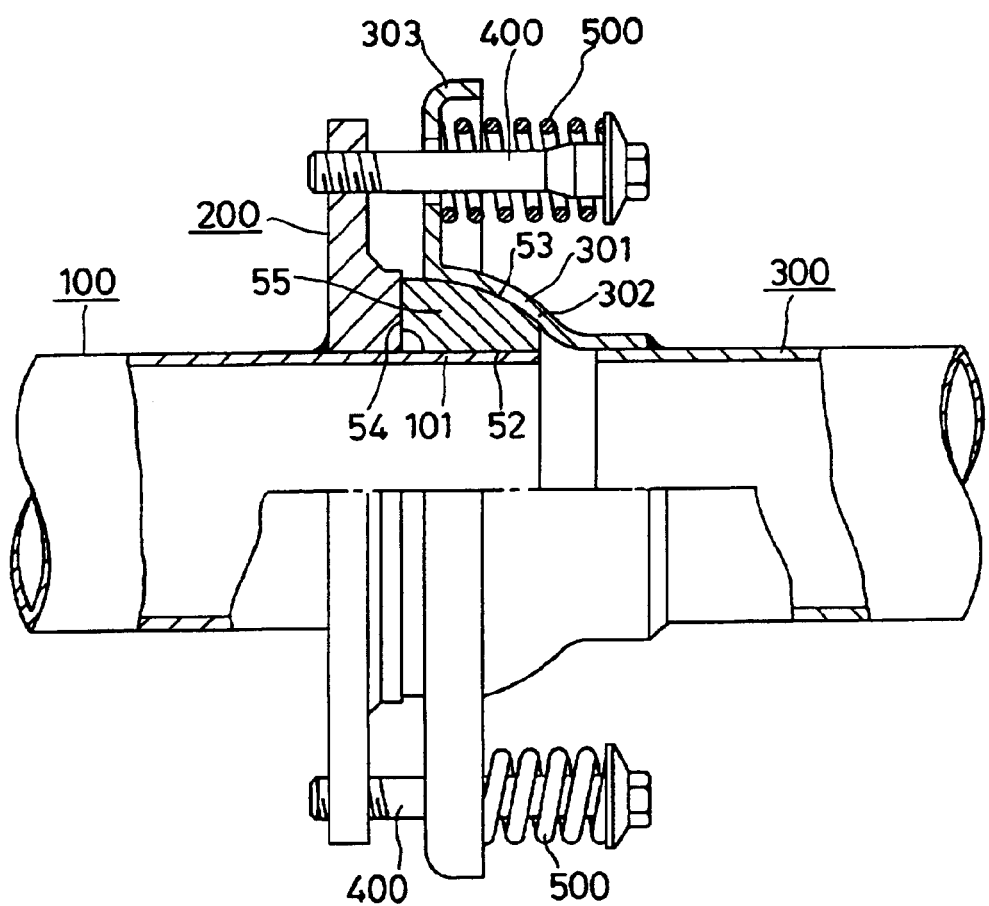
FIG. 18 is a vertical cross-sectional view of an exhaust pipe spherical joint in which the spherical annular seal member in accordance with the present invention has been incorporated.

The spherical annular seal member 55 is used by being incorporated in the exhaust pipe spherical joint shown in FIG. 18, for example. That is, a flange 200 is provided uprightly on an outer peripheral surface of an upstream-side exhaust pipe 100, which is connected to an engine, by leaving a pipe end 101. The spherical annular seal member 55 is fitted over the pipe end 101 at the cylindrical inner surface 52 defining the through hole 51, and is seated with its large-diameter-side end face 54 abutting against that flange 200. A downstream-side exhaust pipe 300 opposes at one end the upstream-side exhaust pipe 100 and is connected at the other end to a muffler. A flared portion 301, which is comprised of a concave spherical surface portion 302 and a flange portion 303 provided at a rim of an opening portion of the concave spherical surface portion 302, is formed integrally at one end of the downstream-side exhaust pipe 300. The exhaust pipe 300 is disposed with the concave spherical surface portion 302 slidingly abutting against the outer surface 53 formed in the shape of the partially convex spherical surface of the spherical annular seal member 55.

In the exhaust pipe spherical joint shown in FIG. 18, the downstream-side exhaust pipe 300 is constantly urged resiliently toward the upstream-side exhaust pipe 100 by means of a pair of bolts 400 each having one end fixed to the flange 200 and another end arranged by being inserted in the flange portion 303 of the flared portion 301, and by means of a pair of coil springs 500 each arranged between an enlarged head of the bolt 400 and the flange portion 303. The exhaust pipe spherical joint is arranged such that relative angular displacements occurring in the upstream- and downstream-side exhaust pipes 100 and 300 are allowed by sliding contact between the outer surface 53 formed in the shape of the partially convex spherical surface of the spherical annular seal member 55 and the concave spherical surface portion 302 of the flared portion 301 formed at the end of the downstream-side exhaust pipe 300.

EXAMPLES

Next, the present invention will be described in detail in accordance with examples. It should be noted that the present invention is not limited to these examples.

Examples 1 to 15

While 300 parts by weight of concentrated sulfuric acid of a 98% concentration was being agitated, 5 parts by weight of a 60% aqueous solution of hydrogen peroxide was added to it as an oxidizing agent, and this solution was used as a reaction solution. This reaction solution was cooled and kept at a temperature of 10° C., 100 parts by weight of natural flake graphite powder having a particle size of 30 to 80 meshes was added to this reaction solution, and reaction was allowed to take place for 30 minutes. After the reaction, acidized graphite was separated by suction filtration, and a cleaning operation was repeated twice in which the acidized graphite was agitated in 300 parts by weight of water for 10 minutes and was then subjected to suction filtration, thereby removing the sulfuric acid content from the acidized graphite.

Then, the acidized graphite with the sulfuric acid content sufficiently removed was dried for 3 hours in a drying furnace held at a temperature of 110° C., and this acidized graphite was used as an acidized graphite material. While agitating 100 parts by weight of the acidized graphite material, a solution in which 0.16 to 3.5 parts by weight of aqueous orthophosphoric acid of an 84% concentration as a phosphoric acid and 2 to 38 parts by weight of aqueous aluminum primary phosphate of a 50% concentration as a phosphate were diluted with 10 parts by weight of methanol was compounded in the form of a spray with this acidized graphite material, and was agitated uniformly to obtain a wet mixture. This wet mixture was dried for 2 hours in the drying furnace held at a temperature of 120° C.

The dried mixture was subjected to treatment for 5 seconds at a temperature of 1000° C. to generate cracked gases, and graphite layers were subjected to expansion by the gas pressure, thereby obtaining expanded graphite particles with an expansion factor of 240-fold. In this expansion treatment process, orthophosphoric acid among the components underwent dehydration reaction to generate phosphorus pentoxide, while aluminum primary phosphate practically did not change and was contained in the expanded graphite particles in coexistence with phosphorus pentoxide. These expanded graphite particles were subjected to roll forming by passing them into a rolling machine, thereby fabricating an expanded graphite sheet with a thickness of 0.38 mm. This expanded graphite sheet was used as the heat-resistant sheet member. This heat-resistant sheet member was composed of 0.1 to 2.0 wt. % of phosphorus pentoxide, 1.0 to 16.0 wt. % of aluminum primary phosphate, and 83.8 to 98.9 wt. % of expanded graphite.

The heat-resistant sheet member thus fabricated and composed of 0.1 to 2.0 wt. % of phosphorus pentoxide, 1.0 to 16.0 wt. % of aluminum primary phosphate, and 83.8 to 98.9 wt. % of expanded graphite was cut into a width of 55 mm and a length of 550 mm (the weight of the heat-resistant sheet member: 11.7 g).

By using two austenitic stainless steel wires (SUS 304) having a wire diameter of 0.28 mm as fine metal wires, a cylindrical woven metal wire net whose meshes were 4.0 mm was fabricated and was passed between a pair of rollers to form a belt-shaped metal wire net (the weight of the belt-shaped metal wire net being 21 g) with a width of 36 mm and a length of 360 mm. The metal wire net thus formed was used as the reinforcing member.

After the aforementioned heat-resistant sheet member 1 cut into a width of 55 mm and a length of 550 mm was convoluted by a one-circumference portion, the reinforcing member 6 was superposed on the inner side of the heat-resistant sheet member 1, and the superposed assembly thereof was convoluted, thereby preparing the tubular base member 7 in which the heat-resistant sheet member 1 was exposed on the outermost periphery. In this tubular base member 7, widthwise opposite end portions of the heat-resistant sheet member 1 respectively projected from the reinforcing member in the widthwise direction (see FIG. 15).

Another heat-resistant sheet member 1 composed of 0.1 to 2.0 wt. % of phosphorus pentoxide, 1.0 to 16.0 wt. % of aluminum primary phosphate, and 83.8 to 98.9 wt. % of expanded graphite was prepared separately, and was cut into a width of 48 mm and a length of 212 mm (the weight of the heat-resistant sheet member: 3.9 g).

By using a fine metal wire similar to the one described above, a cylindrical woven metal wire net whose meshes were 4.0 mm was formed, and was passed between the pair of rollers, thereby fabricating the belt-shaped metal wire net with a width of 53.5 mm and a length of 212 mm (the weight of the metal wire net: 10 g). The heat-resistant sheet member 1 was inserted into the belt-shaped metal wire net, and an assembly thereof was passed between the pair of rollers 8 and 9 so as to be formed integrally, thereby fabricating the outer-surface-layer forming member 10 in which the reinforcing member 6 and the heat-resistant sheet member 1, which filled the meshes of the reinforcing member 6 and was composed of expanded graphite, phosphorus pentoxide, and aluminum primary phosphate, were present in mixed form.

This outer-surface-layer forming member 10 was wound around the outer peripheral surface of the aforementioned tubular base member 7, thereby preparing the cylindrical preform 11. This cylindrical preform 11 was fitted over the stepped core 34 of the die 37 shown in FIG. 8, and was placed in the hollow portion of the die 37.

The cylindrical preform 11 located in the hollow portion of the die 37 was subjected to compression forming under a pressure of 2 tons/cm$^2$ in the direction of the core axis. Thus, the spherical annular seal member 55 was obtained which had the cylindrical inner surface 52 defining the through hole 51 in its central portion, the outer surface 53 formed in the shape of the partially convex spherical surface, and the annular end face 54.

In the spherical annular seal member 55 fabricated in the above-described manner, in its inner portion extending from the cylindrical inner surface 52 to the outer surface 53 formed in the shape of the partially convex spherical surface, the heat-resistant sheet member 1, which was composed of phosphorus pentoxide, aluminum primary phosphate, and expanded graphite, and the reinforcing member 6 constituted by the metal wire net 5 were compressed and intertwined with each other, and were thus arranged to be provided with structural integrity. The outer surface 53 formed in the shape of the partially convex spherical surface was formed into a smooth surface where the outer surface layer of the heat-resistant material, which was composed of phosphorus pentoxide, aluminum primary phosphate, and expanded graphite, as well as the reinforcing member 6 constituted by the metal wire net 5 integrated with this outer surface layer in mixed form, were exposed. At the cylindrical inner surface 52 defining the through hole and the annular end face 54 on the large-diameter side of the outer surface 53 formed in the shape of the partially convex spherical surface, the layer of the heat-resistant material composed of phosphorus pentoxide, aluminum primary phosphate, and expanded graphite was formed in an exposed manner.

Examples 16 to 20

The acidized graphite material was prepared in the same way as in the foregoing examples. While agitating 100 parts by weight of the acidized graphite material, a solution in which 0.7 to 3.5 parts by weight of aqueous orthophosphoric acid of an 84% concentration as a phosphoric acid and 4.0 to 8.5 parts by weight of aqueous calcium primary phosphate of a 50% concentration as a phosphate were diluted with 20 parts by weight of methanol was compounded in the form of a mist with this acidized graphite material, and was agitated uniformly to obtain a wet mixture.

Thereafter, expanded graphite particles were obtained in the same way as in the foregoing examples. In this expansion treatment process, orthophosphoric acid among the components underwent dehydration reaction to generate phosphorus pentoxide, while calcium primary phosphate practically did not change and was contained in the expanded graphite particles in coexistence with phosphorus pentoxide. These expanded graphite particles were subjected to roll forming by passing them into a rolling machine, thereby fabricating an expanded graphite sheet with a thickness of 0.38 mm. This expanded graphite sheet was used as the heat-resistant sheet member. This heat-resistant sheet member was composed of 0.4 to 2.0 wt. % of phosphorus pentoxide, 2.0 to 4.0 wt. % of calcium primary phosphate, and 94.0 to 97.6 wt. % of expanded graphite.

The heat-resistant sheet member thus fabricated and composed of 0.4 to 2.0 wt. % of phosphorus pentoxide, 2.0 to 4.0 wt. % of calcium primary phosphate, and 94.0 to 97.6 wt. % of expanded graphite was cut into a width of 55 mm and a length of 550 mm (the weight of the heat-resistant sheet member: 11.7 g).

A reinforcing member constituted by a metal wire net similar to that of the foregoing examples was prepared, and the tubular base member 7 was fabricated by the heat-resistant sheet member 1 and the reinforcing member 6 in the same way as the foregoing examples.

Another heat-resistant sheet member 1 composed of 0.4 to 2.0 wt. % of phosphorus pentoxide, 2.0 to 4.0 wt. % of calcium primary phosphate, and 94.0 to 97.6 wt. % of expanded graphite was prepared separately, and was cut into a width of 48 mm and a length of 212 mm (the weight of the heat-resistant sheet member: 3.9 g).

By using a fine metal wire similar to that of the foregoing examples, a cylindrical woven metal wire net whose meshes were 4.0 mm was formed, and was passed between the pair of rollers, thereby fabricating the belt-shaped metal wire net with a width of 53.5 mm and a length of 212 mm (the weight of the metal wire net: 10 g). The heat-resistant sheet member 1 was inserted into the belt-shaped metal wire net 5, and an assembly thereof was passed between the pair of rollers so as to be formed integrally, thereby fabricating the outer-surface-layer forming member 10 in which the reinforcing member 6 and the heat-resistant sheet member, which filled the meshes of the reinforcing member 6 and was composed of expanded graphite, phosphorus pentoxide, and calcium primary phosphate, were present in mixed form.

Thereafter, the spherical annular seal member 55 was fabricated in the same way as the foregoing examples. In the spherical annular seal member 55 thus fabricated, in its inner portion extending from the cylindrical inner surface 52 to the outer surface 53 formed in the shape of the partially convex spherical surface, the heat-resistant sheet member 1, which was composed of phosphorus pentoxide, calcium primary phosphate, and expanded graphite, and the reinforcing member 6 constituted by the metal wire net 5 were compressed and intertwined with each other, and were thus arranged to be provided with structural integrity. The outer surface 53 formed in the shape of the partially convex spherical surface was formed into a smooth surface where the outer surface layer of the heat-resistant material, which was composed of phosphorus pentoxide, calcium primary phosphate, and expanded graphite, as well as the reinforcing member constituted by the metal wire net integrated with this outer surface layer in mixed form, were exposed. At the cylindrical inner surface 52 defining the through hole 51 and the annular end face 54 on the large-diameter side of the outer surface 53 formed in the shape of the partially convex spherical surface, the layer of the heat-resistant material composed of phosphorus pentoxide, calcium primary phosphate, and expanded graphite was formed in an exposed manner.

Examples 21 to 25

The heat-resistant sheet member 1 and the reinforcing member 6 constituted by the metal wire net 5, which were similar to those of Examples 6, 10, 11, 12, and 14, were prepared, and the tubular base members 7 were respectively fabricated from the heat-resistant sheet member 1 and the reinforcing member 6 in the same way as in Example 1.

Another heat-resistant sheet member 1 similar to the heat-resistant sheet member 1 for forming the tubular base member 7 was prepared separately. An aqueous dispersion (25.5 wt. % of boron nitride, 4.5 wt. % of alumina, and 70 wt. % of water) containing as a solid content 30 wt. % of a lubricating composition constituted of 85 wt. % of boron nitride with an average particle size of 7 μm and 15 wt. % of alumina powder with an average particle size of 0.6 μm was applied by roller coating to one surface of the heat-resistant sheet member 1 cut into a width of 48 mm and a length of 212 mm, and was then dried. This coating operation was repeated three times to form the lubricating sliding layer 12 of the lubricating composition (weight of the heat-resistant sheet member 1 having the lubricating sliding layer 12: 4.6 g).

A belt-shaped metal wire net similar to that of the above-described Example 1 was prepared, and the heat-resistant sheet member 1 having the outer surface layer 12 of the lubricating composition was inserted into the belt-shaped metal wire net 5, and an assembly thereof was passed between the pair of rollers 13 and 14 so as to be formed integrally, thereby fabricating the outer-surface-layer forming member 15 in which the reinforcing member 6 and the lubricating composition, which filled the meshes of the reinforcing member 6., were present in mixed form on one surface thereof.

This outer-surface-layer forming member 15 was wound around the outer peripheral surface of the aforementioned tubular base member 7 with the surface of the lubricating sliding layer 12 placed on the outer side, thereby preparing the cylindrical preform 16. Thereafter, the spherical annular seal member 55 was fabricated in the same way as in Example 1. In the spherical annular seal member 55 thus fabricated, in its inner portion extending from the cylindrical inner surface 52 to the outer surface 53 formed in the shape of the partially convex spherical surface, the heat-resistant sheet member 1, which was composed of phosphorus pentoxide, aluminum primary phosphate, and expanded graphite, and the reinforcing member 6 constituted by the metal wire net 5 were compressed and intertwined with each other, and were thus arranged to be provided with structural integrality. The outer surface 53 formed in the shape of the partially convex spherical surface was formed into a smooth surface where the outer surface layer formed of the lubricating composition and the reinforcing member constituted by the metal wire net integrated with this outer surface layer in mixed form were exposed. At the cylindrical inner surface 52 defining the through hole 51 and the end face 54 on the large-diameter side of the outer surface 53, the layer of the heat-resistant material composed of phosphorus pentoxide, aluminum primary phosphate, and expanded graphite was formed in an exposed manner.

Examples 26 to 30

The heat-resistant sheet member 1 and the reinforcing member 6 constituted by the metal wire net 5, which were similar to those of Examples 5, 10, 11, 12, and 14, were prepared, and the tubular base members 7 were respectively fabricated from the heat-resistant sheet member 1 and the reinforcing member 6 in the same way as in Example 1.

Another heat-resistant sheet member 1 similar to the heat-resistant sheet member 1 for forming the tubular base member 7 was prepared separately. An aqueous dispersion (17 wt. % of boron nitride, 3 wt. % of alumina, 10 wt. % of polytetrafluoroethylene resin, and 70 wt. % of water) containing as a solid content 30 wt. % of a lubricating composition (56.7 wt. % of boron nitride, 10 wt. % of alumina, and 33.3 wt. % of polytetrafluoroethylene resin), in which a mixture constituted of 85 wt. % of boron nitride with an average particle size of 7 μm and 15 wt. % of alumina powder with an average particle size of 0.6 μm was set as 100 parts by weight, and which further contained 50 parts by weight of polytetrafluoroethylene resin powder with an average particle size of 0.3 μm, was applied by roller coating to one surface of the heat-resistant sheet member 1 cut into a width of 48 mm and a length of 212 mm, and was then dried. This coating operation was repeated three times to form the lubricating sliding layer 12 of the lubricating composition (weight of the heat-resistant sheet member 1 having the lubricating sliding layer 12: 4.6 g).

A belt-shaped metal wire net similar to that of the above-described Example 1 was prepared, and the heat-resistant sheet member 1 having the lubricating sliding layer 12 of the lubricating composition was inserted into the belt-shaped metal wire net, and an assembly thereof was passed between the pair of rollers 13 and 14 so as to be formed integrally, thereby fabricating the outer-surface-layer forming member 15 in which the reinforcing member 6 and the lubricating composition, which filled the meshes of the reinforcing member 6, were present in mixed form on one surface thereof.

This outer-surface-layer forming member 15 was wound around the outer peripheral surface of the aforementioned tubular base member 7 with the surface of the lubricating sliding layer 12 placed on the outer side, thereby preparing the cylindrical preform 16. Thereafter, the spherical annular seal member 55 was fabricated in the same way as in Example 1. In the spherical annular seal member 55 thus fabricated, in its inner portion extending from the cylindrical inner surface 52 to the outer surface 53 formed in the shape of the partially convex spherical surface, the heat-resistant sheet member 1, which was composed of phosphorus pentoxide, aluminum primary phosphate, and expanded graphite, and the reinforcing member 6 constituted by the metal wire net 5 were compressed and intertwined with each other, and were thus arranged to be provided with structural integrality. The outer surface 53 formed in the shape of the partially convex spherical surface was formed into a smooth surface where the outer surface layer formed of the lubricating composition and the reinforcing member constituted by the metal wire net integrated with this outer surface layer in mixed form were exposed. At the cylindrical inner surface 52 defining the through hole 51 and the annular end face 54 on the large-diameter side of the outer surface 53, the layer of the heat-resistant material composed of phosphorus pentoxide, aluminum primary phosphate, and expanded graphite was formed in an exposed manner.

Comparative Example 1

An expanded graphite sheet ("Nicafilm (trade name)" made by Nippon Carbon Co., Ltd.) (the weight of the expanded graphite sheet: 11.6 g) having a width of 55 mm, a length of 550 mm, and a thickness of 0.4 mm was prepared. As the reinforcing member, a belt-shaped metal wire net (36 mm wide and 360 mm long) similar to that of the above-described Example 1 was prepared. After the expanded graphite sheet was convoluted by a one-circumference portion, this reinforcing member was superposed on the inner side of the expanded graphite sheet, and the superposed assembly thereof was convoluted, thereby preparing a tubular base member in which the expanded graphite sheet was located on the outermost periphery. In this tubular base member, widthwise opposite end portions of the expanded graphite sheet respectively projected from the reinforcing member in the widthwise direction.

Another expanded graphite sheet similar to the aforementioned expanded graphite sheet was prepared separately, and was cut into a width of 48 mm and a length of 212 mm. An aqueous dispersion (17 wt. % of boron nitride, 3 wt. % of alumina, 10 wt. % of polytetrafluoroethylene resin, and 70 wt. % of water) containing as a solid content 30 wt. % of a lubricating composition (56.7 wt. % of boron nitride, 10 wt. % of alumina, and 33.3 wt. % of polytetrafluoroethylene resin), in which a mixture constituted of 85 wt. % of boron nitride with an average particle size of 7 µm and 15 wt. % of alumina powder with an average particle size of 0.6 µm was set as 100 parts by weight, and which further contained 50 parts by weight of polytetrafluoroethylene resin powder with an average particle size of 0.3 µm, was applied by roller coating to one surface of this expanded graphite sheet, and was then dried. This coating operation was repeated three times to form the lubricating sliding layer of the lubricating composition (weight of the heat-resistant sheet member having the lubricating sliding layer: 4.6 g).

A belt-shaped metal wire net with a width of 53.5 mm and a length of 212 mm and similar to that of the above-described Example 1 was prepared. The expanded graphite sheet having the lubricating sliding layer of the lubricating composition was inserted into the belt-shaped metal wire net, and an assembly thereof was passed between the pair of rollers so as to be formed integrally, thereby fabricating the outer-surface-layer forming member in which the reinforcing member and the lubricating composition, which filled the meshes of the reinforcing member, were present in mixed form. This outer-surface-layer forming member was wound around the outer peripheral surface of the aforementioned tubular base member with the lubricating sliding layer of the lubricating composition placed on the outer side, thereby preparing the cylindrical preform. Thereafter, the spherical annular seal member was fabricated in the same way as in Example 1. In the spherical annular seal member thus fabricated, in its inner portion extending from the cylindrical inner surface to the outer surface formed in the shape of the partially convex spherical surface, the expanded graphite sheet and the reinforcing member constituted by the metal wire net were compressed and intertwined with each other, and were thus arranged to be provided with structural integrality. The outer surface formed in the shape of the partially convex spherical surface was formed into a smooth surface where the outer surface layer formed of the lubricating composition and the reinforcing member constituted by the metal wire net integrated with this outer surface layer in mixed form were exposed. At the cylindrical inner surface defining the through hole and the end face on the large-diameter side of the outer surface, expanded graphite was formed in an exposed manner.

Comparative Example 2

An expanded graphite sheet similar to that of the above-described Comparative Example 1 was prepared. An aqueous solution of aluminum primary phosphate of a 25% concentration was prepared, and the overall surfaces of the aforementioned expanded graphite sheet were coated with this aqueous solution by roller coating, and the thus-coated expanded graphite sheet was then allowed to dry for 20 minutes at a temperature of 150° C. in a drying furnace so as to form a heat-resistant coating in an amount of 0.07 g/100 cm$^2$ and with a uniform thickness on the overall surfaces of the expanded graphite sheet. The sheet thus obtained was used as the heat-resistant sheet member (weight of the heat-resistant sheet member: 12.03 g).

As the reinforcing member, a belt-shaped metal wire net (36 mm wide and 360 mm long) similar to that of the above-described Example 1 was prepared. After the heat-resistant sheet member was convoluted by a one-circumference portion, this reinforcing member was superposed on the inner side of the heat-resistant sheet member, and the superposed assembly thereof was convoluted, thereby preparing a tubular base member in which the heat-resistant sheet member was located on the outermost periphery. In this tubular base member, widthwise opposite end portions of the heat-resistant sheet member respectively projected from the reinforcing member in the widthwise direction.

Another heat-resistant sheet member similar to the aforementioned heat-resistant sheet member was prepared separately, and was cut into a width of 48 mm and a length of 212 mm. An aqueous dispersion (17 wt. % of boron nitride, 3 wt. % of alumina, 10 wt. % of polytetrafluoroethylene resin, and 70 wt. % of water) containing as a solid content 30 wt. % of a lubricating composition (56.7 wt. % of boron nitride, 10 wt. % of alumina, and 33.3 wt. % of polytetrafluoroethylene resin), in which a mixture constituted of 85 wt. % of boron nitride with an average particle size of 7 µm and 15 wt. % of alumina powder with an average particle size of 0.6 µm was set as 100 parts by weight, and which further contained 50 parts by weight of polytetrafluoroethylene resin powder with an average particle size of 0.3 µm, was applied by roller coating to one surface of this heat-resistant sheet member, and was then dried. This coating operation was repeated three times to form the lubricating sliding layer of the lubricating composition (weight of the heat-resistant sheet member having the lubricating sliding layer: 4.75 g).

A belt-shaped metal wire net with a width of 53.5 mm and a length of 212 mm and similar to that of the above-described Example 1 was prepared. The heat-resistant sheet member having the heat-resistant coating was inserted into the belt-shaped metal wire net, and an assembly thereof was passed between the pair of rollers so as to be formed integrally, thereby fabricating the outer-surface-layer forming member in which the reinforcing member and the heat-resistant coating, which filled the meshes of the reinforcing member, were present in mixed form.

This outer-surface-layer forming member was wound around the outer peripheral surface of the aforementioned tubular base member with the surface of the lubricating sliding layer placed on the outer side, thereby preparing the cylindrical preform. Thereafter, the spherical annular seal member was fabricated in the same way as in Example 1. In the spherical annular seal member thus fabricated, in its inner portion extending from the cylindrical inner surface to the outer surface formed in the shape of the partially convex spherical surface, the heat-resistant sheet member having the heat-resistant coating constituted of aluminum primary phosphate and the reinforcing member constituted by the metal wire net were compressed and intertwined with each other, and were thus arranged to be provided with structural integrality. The outer surface formed in the shape of the partially convex spherical surface was formed into a smooth surface where the outer surface layer formed of the lubricating composition and the reinforcing member constituted by the metal wire net integrated with this outer surface layer in mixed form were exposed. At the cylindrical inner surface defining the through hole and the end face on the large-diameter side of the outer surface, the heat-resistant coating constituted of aluminum primary phosphate was formed in an exposed manner.

Comparative Example 3

An expanded graphite sheet similar to that of the above-described Comparative Example 1 was prepared. An aqueous solution of aluminum primary phosphate of a 25% concentration was prepared, and 15 g of graphite powder with an average particle size of 18 μm was mixed in 30 g of this aqueous solution, and a mixture was thereby obtained. The overall surfaces of the aforementioned expanded graphite sheet were coated with this aqueous solution by roller coating, and the thus-coated expanded graphite sheet was then allowed to dry for 20 minutes at a temperature of 150° C. in a drying furnace so as to form a heat-resistant coating in an amount of 0.3 g/100 cm$^2$ and with a uniform thickness on the overall surfaces of the expanded graphite sheet. The sheet thus obtained was used as the heat-resistant sheet member (weight of the heat-resistant sheet member: 13.43 g).

A belt-shaped metal wire net (36 mm wide and 360 mm long) similar to that of the above-described Example 1 was prepared. After the heat-resistant sheet member was convoluted by a one-circumference portion, this reinforcing member was superposed on the inner side of the heat-resistant sheet member, and the superposed assembly thereof was convoluted, thereby preparing a tubular base member in which the heat-resistant sheet member was located on the outermost periphery. In this tubular base member, widthwise opposite end portions of the heat-resistant sheet member respectively projected from the reinforcing member in the widthwise direction.

Another expanded graphite sheet similar to that of the above-described Comparative Example 1 was prepared separately, and was cut into a width of 48 mm and a length of 212 mm. By using the aforementioned mixture, a heat-resistant sheet member was separately fabricated in which a heat-resistant coating with a uniform thickness of 0.3 g/100 cm$^2$ was formed on the overall surfaces of the expanded graphite sheet in a similar method. An aqueous dispersion (17 wt. % of boron nitride, 3 wt. % of alumina, 10 wt. % of polytetrafluoroethylene resin, and 70 wt. % of water) containing as a solid content 30 wt. % of a lubricating composition (56.7 wt. % of boron nitride, 10 wt. % of alumina, and 33.3 wt. % of polytetrafluoroethylene resin), in which a mixture constituted of 85 wt. % of boron nitride with an average particle size of 7 μm and 15 wt. % of alumina powder with an average particle size of 0.6 μm was set as 100 parts by weight, and which further contained 50 parts by weight of polytetrafluoroethylene resin powder with an average particle size of 0.3 μm, was applied by roller coating to the heat-resistant coating surface of one surface of this heat-resistant sheet member, and was then dried. This coating operation was repeated three times to form the lubricating sliding layer of the lubricating composition (weight of the heat-resistant sheet member having the lubricating sliding layer: 5.23 g). Thereafter, the outer-surface-layer forming member was fabricated in the same way as in Comparative Example 2, and the spherical annular seal member was fabricated in the same way as in Comparative Example 2.

In the spherical annular seal member thus fabricated, in its inner portion extending from the cylindrical inner surface to the outer surface formed in the shape of the partially convex spherical surface, the heat-resistant sheet member having the heat-resistant coating constituted of aluminum primary phosphate and graphite and the reinforcing member constituted by the metal wire net were compressed and intertwined with each other, and were thus arranged to be provided with structural integrality. The outer surface formed in the shape of the partially convex spherical surface was formed into a smooth surface where the outer surface layer formed of the lubricating composition and the reinforcing member constituted by the metal wire net integrated with this outer surface layer in mixed form were exposed. At the cylindrical inner surface defining the through hole and the end face on the large-diameter side of the outer surface, the heat-resistant coating constituted of aluminum primary phosphate and graphite was formed in an exposed manner.

Then, with respect to the spherical annular seal members in accordance with the above-described Examples and Comparative Examples, tests were conducted for measurement of a frictional torque (kgf·cm) and for checking the presence or absence of the occurrence of abnormal noise, the amount of gas leakage, and the weight loss (weight reduction) due to oxidation of the spherical annular seal member for each cycle of the seal member by using the exhaust pipe spherical joint shown in FIG. 18, and its results are discussed below.

<Test Conditions>

| | |
|---|---|
| Pressing force using coil springs (spring set force): | 72 ± 6 kgf |
| Angle of oscillation: | ±3° |
| Frequency: | 12 hertz (Hz) |
| Ambient temperature (the outer surface temperature of the concave spherical surface portion 302 shown in FIG. 18): | from room temperature to 700° C. |

<Test Method>

After 45,000 oscillating motions are performed at room temperature by setting an oscillating motion at ±3° at a frequency of 12 Hz as a unit of oscillation, the ambient temperature is raised to a temperature of 700° C. while continuing the oscillating motions (the number of oscillating motions during the temperature rise being 45,000). When the ambient temperature reached the temperature of 700° C., 115,000 oscillating motions are performed. Finally, the ambient temperature is allowed to drop to room temperature while continuing the oscillating motions (the number of oscillating motions during the temperature drop being 45,000). The combined total of 250,000 oscillating motions is set as one cycle, and four cycles are performed.

In addition, the evaluation of the presence or absence of the occurrence of abnormal frictional noise was conducted as follows.

Evaluation Code A: No abnormal frictional noise occurred.

Evaluation Code B: Abnormal frictional noise is slightly heard with the ear brought close to the test piece.

Evaluation Code C: Although the noise is generally difficult to discern from a fixed position (a position 1.5 m distant from the test piece) since it is blanketed by the noises of the living environment, the noise can be discerned as abnormal frictional noise by a person engaged in the test.

Evaluation Code D: The noise can be recognized as abnormal frictional noise (unpleasant sound) by anybody from the fixed position.

As for the amount of gas leakage (litter/min), an opening of one exhaust pipe 100 connected to the exhaust pipe spherical joint shown in FIG. 18 was closed, dry air was allowed to flow into the joint portion from the other exhaust pipe 300 under a pressure of 0.5 kgf/cm$^2$, and the amount of leakage from the joint portion (sliding contact portions between the outer surface 53 of the spherical annular seal member 55 and the flared portion 301, fitting portions between the cylindrical inner surface 52 of the spherical annular seal member 55 and the pipe end portion 101 of the exhaust pipe 100, and abutting portions between the end face 54 and the flange 200 provided uprightly on the exhaust pipe 100) was measured four times in total, i.e., before the test start, after 250,000 oscillating motions, after 500,000 oscillating motions, and after 1,000,000 oscillating motions, by means of a flowmeter.

Tables 1 to 7 show the results of the tests obtained by the above-described test method.

|  | 1 | 2 | 3 | 4 | 5 |
|---|---|---|---|---|---|
| (Composition of Constituents of Heat-resistant Material) | | | | | |
| Expanded graphite | 98.9 | 95.9 | 97.8 | 95.8 | 91.8 |
| Phosphorus pentoxide | 0.1 | 0.1 | 0.2 | 0.2 | 0.2 |
| Aluminum primary phosphate | 1.0 | 4.0 | 2.0 | 4.0 | 8.0 |
| (Test Results) | | | | | |
| Frictional torque | 90–120 | 92–121 | 95–118 | 93–117 | 92–115 |
| Determination of abnormal frictional noise | A–B | A–B | A–B | A–B | A–B |
| Amount of gas leakage | | | | | |
| (1) | 0.05 | 0.06 | 0.05 | 0.07 | 0.08 |
| (2) | 0.08 | 0.09 | 0.08 | 0.09 | 0.09 |
| (3) | 0.24 | 0.19 | 0.16 | 0.15 | 0.10 |
| (4) | 0.45 | 0.30 | 0.30 | 0.28 | 0.18 |
| Weight of seal member before test | 46.6 | 46.4 | 46.5 | 46.6 | 46.5 |
| Weight of seal member after test | 42.4 | 43.2 | 42.3 | 43.3 | 43.7 |
| Weight reduction rate (%) | 9 | 7 | 9 | 7 | 6 |

|  | 6 | 7 | 8 | 9 | 10 |
|---|---|---|---|---|---|
| (Composition of Constituents of Heat-resistant Material) | | | | | |
| Expanded graphite | 89.8 | 87.8 | 85.8 | 83.8 | 95.6 |
| Phosphorus pentoxide | 0.2 | 0.2 | 0.2 | 0.2 | 0.4 |
| Aluminum primary phosphate | 10.0 | 12.0 | 14.0 | 16.0 | 4.0 |
| (Test Results) | | | | | |
| Frictional torque | 93–118 | 92–120 | 94–121 | 93–125 | 94–120 |
| Determination of abnormal frictional noise | A–B | A–B | A–B | A–B | A–B |
| Amount of gas leakage | | | | | |
| (1) | 0.05 | 0.06 | 0.07 | 0.07 | 0.07 |
| (2) | 0.09 | 0.10 | 0.09 | 0.09 | 0.08 |
| (3) | 0.11 | 0.12 | 0.11 | 0.12 | 0.15 |
| (4) | 0.21 | 0.23 | 0.21 | 0.21 | 0.26 |
| Weight of seal member before test | 46.6 | 46.5 | 46.4 | 46.6 | 46.5 |
| Weight of seal member after test | 43.8 | 43.7 | 43.6 | 43.3 | 43.2 |
| Weight reduction rate (%) | 6 | 6 | 6 | 6 | 7 |

|  | 11 | 12 | 13 | 14 | 15 |
|---|---|---|---|---|---|
| (Composition of Constituents of Heat-resistant Material) | | | | | |
| Expanded graphite | 91.6 | 95.3 | 95.0 | 94.5 | 94.0 |
| Phosphorus pentoxide | 0.4 | 0.7 | 1.0 | 1.5 | 2.0 |
| Aluminum primary phosphate | 8.0 | 4.0 | 4.0 | 4.0 | 4.0 |
| (Test Results) | | | | | |
| Frictional torque | 95–123 | 93–118 | 92–121 | 90–118 | 92–121 |
| Determination of abnormal frictional noise | A–B | A–B | A–B | A–B | A–B |
| Amount of gas leakage | | | | | |
| (1) | 0.07 | 0.08 | 0.07 | 0.08 | 0.09 |
| (2) | 0.09 | 0.09 | 0.09 | 0.10 | 0.11 |
| (3) | 0.12 | 0.15 | 0.17 | 0.18 | 0.18 |
| (4) | 0.23 | 0.24 | 0.30 | 0.30 | 0.30 |
| Weight of seal member before test | 46.6 | 46.6 | 46.5 | 46.4 | 46.6 |
| Weight of seal member after test | 43.8 | 43.3 | 43.2 | 43.2 | 43.3 |
| Weight reduction rate (%) | 6 | 7 | 7 | 7 | 7 |

|  | 16 | 17 | 18 | 19 | 20 |
|---|---|---|---|---|---|
| (Composition of Constituents of Heat-resistant Material) | | | | | |
| Expanded graphite | 97.6 | 95.3 | 95.0 | 94.5 | 94.0 |
| Phosphorus pentoxide | 0.4 | 0.7 | 1.0 | 1.5 | 2.0 |
| Aluminum primary phosphate | 2.0 | 4.0 | 4.0 | 4.0 | 4.0 |
| (Test Results) | | | | | |
| Frictional torque | 93–120 | 95–121 | 92–120 | 93–123 | 92–118 |
| Determination of abnormal frictional noise | A–B | A–B | A–B | A–B | A–B |
| Amount of gas leakage | | | | | |
| (1) | 0.08 | 0.07 | 0.08 | 0.09 | 0.07 |
| (2) | 0.09 | 0.09 | 0.10 | 0.10 | 0.09 |
| (3) | 0.15 | 0.15 | 0.17 | 0.18 | 0.17 |
| (4) | 0.36 | 0.28 | 0.30 | 0.32 | 0.30 |
| Weight of seal member before test | 46.6 | 46.5 | 46.6 | 46.4 | 46.5 |
| Weight of seal member after test | 42.4 | 43.2 | 43.3 | 43.2 | 43.2 |
| Weight reduction rate (%) | 9 | 7 | 7 | 7 | 7 |

|  | 21 | 22 | 23 | 24 | 25 |
|---|---|---|---|---|---|
| (Composition of Constituents of Heat-resistant Material) | | | | | |
| Expanded graphite | 89.8 | 95.6 | 91.06 | 95.3 | 94.5 |
| phosphorus pentoxide | 0.2 | 0.4 | 0.4 | 0.7 | 1.5 |
| Aluminum primary phosphate | 10.0 | 4.0 | 8.0 | 4.0 | 4.0 |
| (Test Results) | | | | | |
| Frictional torque | 80–121 | 80–123 | 78–119 | 78–120 | 80–120 |
| Determination of abnormal frictional noise | A | A | A | A | A |
| Amount of gas leakage | | | | | |
| (1) | 0.07 | 0.09 | 0.08 | 0.07 | 0.08 |
| (2) | 0.09 | 0.10 | 0.10 | 0.08 | 0.10 |
| (3) | 0.11 | 0.18 | 0.13 | 0.15 | 0.17 |
| (4) | 0.23 | 0.30 | 0.23 | 0.24 | 0.26 |
| Weight of seal member before test | 47.3 | 47.1 | 47.5 | 47.3 | 47.3 |
| Weight of seal member after test | 44.5 | 43.8 | 44.7 | 44.0 | 44.0 |
| Weight reduction rate (%) | 6 | 7 | 6 | 7 | 7 |

|  | 26 | 27 | 28 | 29 | 30 |
|---|---|---|---|---|---|
| (Composition of Constituents of Heat-resistant Material) | | | | | |
| Expanded graphite | 91.8 | 95.6 | 91.6 | 95.3 | 94.5 |
| Phosphorus pentoxide | 0.2 | 0.4 | 0.4 | 0.7 | 1.5 |
| Aluminum primary phosphate | 8.0 | 4.0 | 8.0 | 4.0 | 4.0 |
| (Test Results) | | | | | |
| Frictional torque | 80–120 | 82–119 | 81–120 | 78–118 | 80–120 |
| Determination of abnormal frictional noise | A | A | A | A | A |
| Amount of gas leakage | | | | | |
| (1) | 0.08 | 0.07 | 0.08 | 0.07 | 0.09 |
| (2) | 0.10 | 0.11 | 0.09 | 0.09 | 0.12 |
| (3) | 0.12 | 0.20 | 0.11 | 0.15 | 0.20 |
| (4) | 0.23 | 0.30 | 0.20 | 0.24 | 0.30 |
| Weight of seal member before test | 47.3 | 47.2 | 47.3 | 47.3 | 47.2 |
| Weight of seal member after test | 44.5 | 43.9 | 44.5 | 44.0 | 43.9 |
| Weight reduction rate (%) | 6 | 7 | 6 | 7 | 7 |

|  |  | Comparative Examples | | |
|---|---|---|---|---|
|  |  | 1 | 2 | 3 |
| Frictional torque |  | 80–120 | 80–102 | 80–98 |
| Determination of abnormal frictional noise |  | A | A | A |
| Amount of gas leakage | (1) | 0.07 | 0.07 | 0.08 |
|  | (2) | 0.45 | 0.15 | 0.13 |
|  | (3) | 2.15 | 0.18 | 0.25 |
|  | (4) | 5.20 | 0.53 | 0.50 |
| Weight of seal member before test |  | 47.3 | 47.8 | 49.7 |
| Weight of seal member after test |  | 31.3 | 39.9 | 42.1 |
| Weight reduction rate (%) |  | 33.8 | 16.5 | 15.2 |

In the above tables, the amount of gas leakage (1) shows the results when the number of oscillating motions was zero (before the test start), (2) shows the results when the number of oscillating motions was 250,000, (3) shows the results when the number of oscillating motions was 500,000, and (4) shows the results when the number of oscillating motions was 1,000,000.

As can be seen from the weight (g) of the seal member before the test and the weight (g) of the seal member after the test in the test results, in the case of the spherical annular seal members in accordance with the examples, the weight reduction ratio due to the oxidation and wear of expanded graphite making up the seal members were not more than 10% even under the high-temperature condition of 700° C., and an increase in the amount of gas leakage ascribable to the oxidation and wear of expanded graphite was not noted in comparison with the Comparative Example. In addition, since the heat-resistant sheet member composed of phosphorus pentoxide, phosphate (aluminum primary phosphate or calcium primary phosphate), and expanded graphite has flexibility which the ordinary expanded graphite sheet has, it was possible to effect the bending process in the method of manufacturing a spherical annular seal member without causing any trouble.

With the spherical annular seal member in accordance with the invention, in its inner portion extending from the cylindrical inner surface to the outer surface formed in the shape of the partially convex spherical surface, the reinforcing member constituted by the compressed metal wire net and the heat-resistant material filling the meshes of the metal wire net of this reinforcing member, compressed in such a manner as to be formed integrally with the reinforcing member in mixed form, and composed of expanded graphite, phosphorus pentoxide, and phosphate are provided, and the heat resistance of the seal member itself has been enhanced. Therefore, the spherical annular seal member in accordance with the invention sufficiently demonstrates its function as the seal member even under the high-temperature condition of 700° C. In addition, with the manufacturing method, since the heat-resistant sheet member composed of expanded graphite, phosphorus pentoxide, and phosphate has flexibility which the ordinary expanded graphite sheet has, no trouble occurs in the process of bending the heat-resistant sheet member which takes place in the manufacturing process. Not only does this fact make it possible to omit the process for forming a coating of a heat-resistant material on the surface of the expanded graphite sheet in the prior art, but it makes it possible to prevent the occurrence of the cracking of the heat-resistant coating which can otherwise occur in the process of bending the expanded graphite sheet having the heat-resistant coating and, hence, the occurrence of the breakage of the expanded graphite sheet, consequently leading to the improvement of the material yield.

What is claimed is:

1. A spherical annular seal member which has a cylindrical inner surface defining a through hole in a central portion thereof, a partially convex spherical outer surface, and an annular end face on a large-diameter side of the partially convex spherical outer surface, and which is used in an exhaust pipe spherical joint of an automobile, comprising:
   a reinforcing member made from a compressed metal wire net and provided in an inner portion of said spherical annular seal member which extends from the cylindrical inner surface to the partially convex spherical outer surface;
   a heat-resistant material containing compressed and expanded graphite, phosphorus pentoxide and a phosphate, and provided in the inner portion of said spherical annular seal member, said heat-resistant material being composed of 0.05 to 5.0 wt. % of phosphorus pentoxide, 1.0 to 16.0 wt. % of the phosphate, and 79.0 to 98.95 wt. % of expanded graphite, and filling meshes of said metal wire net of said reinforcing member and compressed in such a manner as to be formed integrally with said reinforcing member in mixed form, said phosphorus pentoxide and said phosphate being mixed into said compressed and expanded graphite to suppress consumption of said compressed and expanded graphite due to oxidation of the same at temperatures of 600° C. to 700° C., the partially convex spherical outer surface being formed into a smooth surface where an outer surface layer of said heat-resistant material containing said compressed and expanded graphite, phosphorus pentoxide, and the phosphate, which are mixed into said compressed and expanded graphite to suppress consumption of said compressed and expanded graphite due to oxidation of the same at temperatures of 600° C. to 700° C., and said reinforcing member made from the metal wire net and formed integrally with said heat-resistant material in mixed form are exposed.

2. A spherical annular seal member according to claim 1, wherein the cylindrical inner surface is formed of said heat-resistant material containing said compressed and expanded graphite, phosphorus pentoxide and the phosphate.

3. A spherical annular seal member according to claim 1, wherein the cylindrical inner surface is formed of said reinforcing member made from the metal wire net.

4. A spherical annular seal member according to claim 1, wherein the annular end face is formed of said heat-resistant material containing said compressed and expanded graphite, phosphorus pentoxide and the phosphate.

5. A spherical annular seal member according to claim 1, wherein the phosphate is selected from lithium primary phosphate, lithium secondary phosphate, calcium primary phosphate, calcium secondary phosphate, aluminum primary phosphate, and aluminum secondary phosphate.

6. A spherical annular seal member which has a cylindrical inner surface defining a through hole in a central portion thereof, a partially convex spherical outer surface, and an annular end face on a large-diameter side of the partially convex spherical outer surface, and which is used in an exhaust pipe spherical joint of an automobile, comprising:
   a reinforcing member made from a compressed metal wire net and provided in an inner portion of said spherical annular seal member which extends from the cylindrical inner surface to the partially convex spherical outer surface;
   a heat-resistant material containing compressed and expanded graphite, phosphorus pentoxide, and a phosphate, and provided in the inner portion of said spherical annular seal member, said heat-resistant material being composed of 0.05 to 5.0 wt. % of phosphorus pentoxide, 1.0 to 16.0 wt. % of the phosphate, and 79.0 to 98.95 wt. % of expanded graphite, and filling meshes of said metal wire net of said reinforcing member and compressed in such a manner as to be formed integrally with said reinforcing member in mixed form, said phosphorus pentoxide and said phosphate being mixed into said compressed and expanded graphite to suppress consumption of said compressed and expanded graphite due to oxidation of the same at temperatures of 600° C. to 700° C., the partially convex spherical surface being formed into a smooth surface where an outer surface layer of a lubricating composition containing at least boron nitride and at least one of alumina and silica and said reinforcing member made from the metal wire net and formed integrally with said lubricating composition in mixed form are exposed.

7. A spherical annular seal member according to claim 6, wherein the cylindrical inner surface is formed of said heat-resistant material containing said compressed and expanded graphite, phosphorus pentoxide and the phosphate.

8. A spherical annular seal member according to claim 6 wherein the cylindrical inner surface is formed of said reinforcing member made from the metal wire net.

9. A spherical annular seal member according to claim 6, wherein the annular end face is formed of said heat resistant material containing said compressed and expanded graphite, phosphorus pentoxide and the phosphate.

10. A spherical annular seal member according to claim 6, wherein the phosphate is selected from lithium primary phosphate, lithium secondary phosphate, calcium primary phosphate, calcium secondary phosphate, aluminum primary phosphate, and aluminum secondary phosphate.

11. A spherical annular seal member according to claim 6, wherein said lubricating composition contains 70–90 wt. % of boron nitride and 10–30 wt. % of at least one of alumina and silica.

12. A spherical annular seal member according to claim 6, wherein said lubricating composition further contains polytetrafluoroethylene resin.

13. A spherical annular seal member according to claim 6, wherein said lubricating composition contains a mixture consisting of 70–90 wt. % of boron nitride and 10–030 wt. % of at least one of alumina and silica, and further contains not more than 200 parts by weight of polytetrafluoroethylene resin with respect to 100 parts by weight of said mixture.

14. A spherical annular seal member according to claim 6, wherein said lubricating composition contains a mixture consisting of 70–90 wt. % of boron nitride and 10–030 wt. % of at lest one of alumina and silsica, and further comprising 50 to 150 parts by weight of polytetrafluoroethylene resin with respect to 100 parts by weight of said mixture.

15. A spherical annular seal member which has a cylindrical inner surface defining a through hole in a central portion thereof, a partially convex spherical outer surface, and an annular end face on a large-diameter side of the partially convex spherical outer surface, and which is used in an exhaust pipe spherical joint of an automobile, comprising:
a reinforcing member made from a compressed metal wire net and provided in an inner portion of said spherical annular seal member which extends from the cylindrical inner surface to the partially convex spherical outer surface;
a heat-resistant material containing compressed and expanded graphite, phosphorus pentoxide, and a phosphate, and provided in the inner portion of said spherical annular seal member, said heat-resistant material filling meshes of said metal wire net of said reinforcing member and compressed in such a manner as to be formed integrally with said reinforcing member in mixed form, said phosphorus pentoxide and said phosphate being mixed into said compressed and expanded graphite to suppress consumption of said compressed and expanded graphite due to oxidation of the same at temperatures of 600° C. to 700° C., the partially convex spherical surface being formed into a smooth surface where an outer surface layer of a lubricating composition containing at least boron nitride and at least one of alumina and silica and said reinforcing member made from the metal wire net and formed integrally with said lubricating composition in mixed form are exposed, said lubricating composition containing 70 to 90 wt. % of boron nitride and 10 to 30 wt. % of at least one of alumina and silica.

16. A spherical annular seal member according to claim 15, wherein the cylindrical inner surface is formed of said heat-resistant material containing said compressed and expanded graphite, phosphorus pentoxide, and the phosphate.

17. A spherical annular seal member according to claim 15, wherein the cylindrical inner surface is formed of said reinforcing member made from the metal wire net.

18. A spherical annular seal member according to claim 15, wherein the annular end face is formed of said heat-resistant material containing said compressed and expanded graphite, phosphorus pentoxide, and the phosphate.

19. A spherical annular seal member according to claim 15, wherein said heat-resistant material is composed of 0.05 to 5.0 wt. % of phosphorus pentoxide, 1.0 to 16.0 wt. % of the phosphate, and 79.0 to 98.95 wt. % of expanded graphite.

20. A spherical annular seal member according to claim 15, wherein the phosphate is selected from lithium primary phosphate, lithium secondary phosphate, calcium primary phosphate, calcium secondary phosphate, aluminum primary phosphate, and aluminum secondary phosphate.

21. A spherical annular seal member according to claim 15, wherein said lubricating composition further contains polytetrafluoroethylene resin.

22. A spherical annular seal member according to claim 15, wherein said lubricating composition further contains not more than 200 parts by weight of polytetrafluoroethylene resin with respect to 100 parts by weight of a mixture which consists of 70 to 90 wt. % of boron nitride and 10 to 30 wt. % of at least one of alumina and silica.

23. A spherical annular seal member according to claim 15, wherein said lubricating composition further comprises 50 to 150 parts by weight of polytetrafluoroethylene resin with respect to 100 parts by weight of a mixture which consists of 70 to 90 wt. % of boron nitride and 10 to 30 wt. % of at least one of alumina and silica.

24. A spherical annular seal member which has a cylindrical inner surface defining a through hole in a central portion thereof, a partially convex spherical outer surface, and an annular end face on a large-diameter side of the partially convex spherical outer surface, and which is used in an exhaust pipe spherical joint of an automobile, comprising:
a reinforcing member made from a compressed metal wire net and provided in an inner portion of said spherical annular seal member which extends from the cylindrical inner surface to the partially convex spherical outer surface;
a heat-resistant material containing compressed and expanded graphite, phosphorus pentoxide, and a phosphate, and provided in the inner portion of said spherical annular seal member, said heat-resistant material filling meshes of said metal wire net of said reinforcing member and compressed in such a manner as to be formed integrally with said reinforcing member in mixed form, said phosphorus pentoxide and said phosphate being mixed into said compressed and expanded graphite to suppress consumption of said compressed and expanded graphite due to oxidation of the same at temperatures of 600° C. to 700° C., the partially convex spherical surface being formed into a smooth surface where an outer surface layer of a lubricating composition containing at least boron nitride, at least one of alumina and silica, and polytetrafluoroethylene resin and said reinforcing member made from the metal wire net and formed integrally with said lubricating composition in mixed form are exposed, said lubricating composition containing a mixture consisting of 70 to 90 wt. % of boron nitride and 10 to 30 wt. % of at least one of alumina and silica, and further containing not more than 200 parts by weight of polytetrafluoroethylene resin with respect to 100 parts by weight of said mixture.

25. A spherical annular seal member according to claim 24, wherein the cylindrical inner surface is formed of said heat-resistant material containing said compressed and expanded graphite, phosphorus pentoxide, and the phosphate.

26. A spherical annular seal member according to claim 24, wherein the cylindrical inner surface is formed of said reinforcing member made from the metal wire net.

27. A spherical annular seal member according to claim 24, wherein the annular end face is formed of said heat-resistant material containing said compressed and expanded graphite, phosphorus pentoxide, and the phosphate.

28. A spherical annular seal member according to claim 24, wherein said heat-resistant material is composed of 0.05 to 5.0 wt. % of phosphorus pentoxide, 1.0 to 16.0 wt. % of the phosphate, and 79.0 to 98.95 wt. % of expanded graphite.

29. A spherical annular seal member according to claim 24, wherein the phosphate is selected from lithium primary phosphate, lithium secondary phosphate, calcium primary phosphate, calcium secondary phosphate, aluminum primary phosphate, and aluminum secondary phosphate.

30. A spherical annular seal member according to claim 24, wherein said lubricating composition comprises 50 to 150 parts by weight of polytetrafluoroethylene resin with respect to 100 parts by weight of said mixture.

31. A spherical annular seal member which has a cylindrical inner surface defining a through hole in a central portion thereof, a partially convex spherical outer surface, and an annular end face on a large-diameter side of the partially convex spherical outer surface, and which is used in an exhaust pipe spherical joint of an automobile, comprising:
  a reinforcing member made from a compressed metal wire net and provided in an inner portion of said spherical annular seal member which extends from the cylindrical inner surface to the partially convex spherical outer surface;
  a heat-resistant material containing compressed and expanded graphite, phosphorus pentoxide, and a phosphate, and provided in the inner portion of said spherical annular seal member, said heat-resistant material filling meshes of said metal wire net of said reinforcing member and compressed in such a manner as to be formed integrally with said reinforcing member in mixed form, said phosphorus pentoxide and said phosphate being mixed into said compressed and expanded graphite to suppress consumption of said compressed and expanded graphite due to oxidation of the same at temperatures of 600° C. to 700° C., the partially convex spherical surface being formed into a smooth surface where an outer surface layer of a lubricating composition containing at least boron nitride, at least one of alumina and silica, and polytetrafluoroethylene resin and said reinforcing member made from the metal wire net and formed integrally with said lubricating composition in mixed form are exposed, said lubricating composition containing a mixture consisting of 70 to 90 wt. % of boron nitride and 10 to 30 wt. % of at least one of alumina and silica, and further comprising 50 to 150 parts by weight of polytetrafluoroethylene resin with respect to 100 parts by weight of said mixture.

32. A spherical annular seal member according to claim 31, wherein the cylindrical inner surface is formed of said heat-resistant material containing said compressed and expanded graphite, phosphorus pentoxide, and the phosphate.

33. A spherical annular seal member according to claim 31, wherein the cylindrical inner surface is formed of said reinforcing member made from the metal wire net.

34. A spherical annular seal member according to claim 31, wherein the annular end face is formed of said heat-resistant material containing said compressed and expanded graphite, phosphorus pentoxide, and the phosphate.

35. A spherical annular seal member according to claim 31, wherein said heat-resistant material is composed of 0.05 to 5.0 wt. % of phosphorus pentoxide, 1.0 to 160 wt. % of the phosphate, and 79.0 to 98.95 wt. % of expanded graphite.

36. A spherical annular seal member according to claim 31, wherein the phosphate is selected from lithium primary phosphate, lithium secondary phosphate, calcium primary phosphate, calcium secondary phosphate, aluminum primary phosphate, and aluminum secondary phosphate.

* * * * *